(12) United States Patent
Chang et al.

(10) Patent No.: US 9,684,295 B2
(45) Date of Patent: Jun. 20, 2017

(54) MOLDING SYSTEM AND METHOD FOR OPERATING THE SAME

(71) Applicant: CORETECH SYSTEM CO., LTD., Hsinchu County (TW)

(72) Inventors: Yuing Chang, Hsinchu County (TW); Chuan Wei Chang, Hsinchu County (TW); Rong Yeu Chang, Hsinchu County (TW); Chia Hsiang Hsu, Hsinchu County (TW); Ching Chang Chien, Hsinchu County (TW); Hsien Sen Chiu, Hsinchu County (TW)

(73) Assignee: CORETECH SYSTEM CO., LTD., Hsinchu County (TW)

( * ) Notice: Subject to any disclaimer, the term of this patent is extended or adjusted under 35 U.S.C. 154(b) by 0 days.

(21) Appl. No.: 15/208,416

(22) Filed: Jul. 12, 2016

(65) Prior Publication Data
US 2017/0015040 A1    Jan. 19, 2017

Related U.S. Application Data

(60) Provisional application No. 62/191,806, filed on Jul. 13, 2015.

(51) Int. Cl.
*G06F 19/00*    (2011.01)
*G05B 17/02*    (2006.01)
(Continued)

(52) U.S. Cl.
CPC .......... *G05B 17/02* (2013.01); *B29C 45/7693* (2013.01); *G05B 19/042* (2013.01);
(Continued)

(58) Field of Classification Search
USPC ......................................... 700/201, 202–203
See application file for complete search history.

(56) References Cited

U.S. PATENT DOCUMENTS

| | | | | |
|---|---|---|---|---|
| 4,816,197 A | * | 3/1989 | Nunn ...................... | B29C 45/76 264/40.1 |
| 5,260,010 A | * | 11/1993 | Yokota .................... | B29C 45/76 264/40.4 |

(Continued)

OTHER PUBLICATIONS

Rong-Yeu Chang et al., Numerical simulation of mold filling in injection molding using a three-dimensional finite volume approach, International Journal for Numerical Methods in Fluids, 2001, 37, 125-148, DOI: 10.1002/fld.166, John Wiley & Sons, Ltd.

(Continued)

*Primary Examiner* — Kidest Bahta
(74) *Attorney, Agent, or Firm* — WPAT, P.C., Intellectual Property Attorneys; Anthony King

(57) ABSTRACT

A method for operating a molding machine includes specifying a simulating domain corresponding to a genuine domain in a mold disposed on the molding machine. The method proceeds to perform a virtual molding by using a setting packing pressure profile to generate a simulated state waveform, generating a designed state waveform including an isobaric phase and an isochoric phase while taking into consideration the simulated state waveform, and obtaining an updated packing pressure profile for applying a molding pressure to a portion of the genuine domain while taking into consideration a difference between the simulated state waveform and the designed state waveform. Subsequently, the method proceeds to set the molding machine while taking into consideration the updated packing pressure profile to perform an actual molding by applying an actual molding pressure to the at least a portion of the genuine domain to prepare the molding product.

10 Claims, 39 Drawing Sheets

(51) Int. Cl.
G05B 19/4097 (2006.01)
G05B 19/042 (2006.01)
B29C 45/76 (2006.01)

(52) U.S. Cl.
CPC .. *G05B 19/4097* (2013.01); *B29C 2945/7604* (2013.01); *B29C 2945/76006* (2013.01); *B29C 2945/76254* (2013.01); *B29C 2945/76434* (2013.01); *G05B 2219/45244* (2013.01)

(56) References Cited

U.S. PATENT DOCUMENTS

| | | | |
|---|---|---|---|
| 5,792,483 A * | 8/1998 | Siegrist | B29C 45/5008 |
| | | | 425/135 |
| 5,911,924 A * | 6/1999 | Siegrist | B29C 45/5008 |
| | | | 264/328.1 |
| 2005/0082707 A1 * | 4/2005 | Sabin | B29C 45/766 |
| | | | 264/40.1 |

OTHER PUBLICATIONS

Lars-Erik Rannar, On Optimization of Injection Molding Cooling, Thesis for the degree doktor ingenior, Apr. 2008, NTNU.

\* cited by examiner

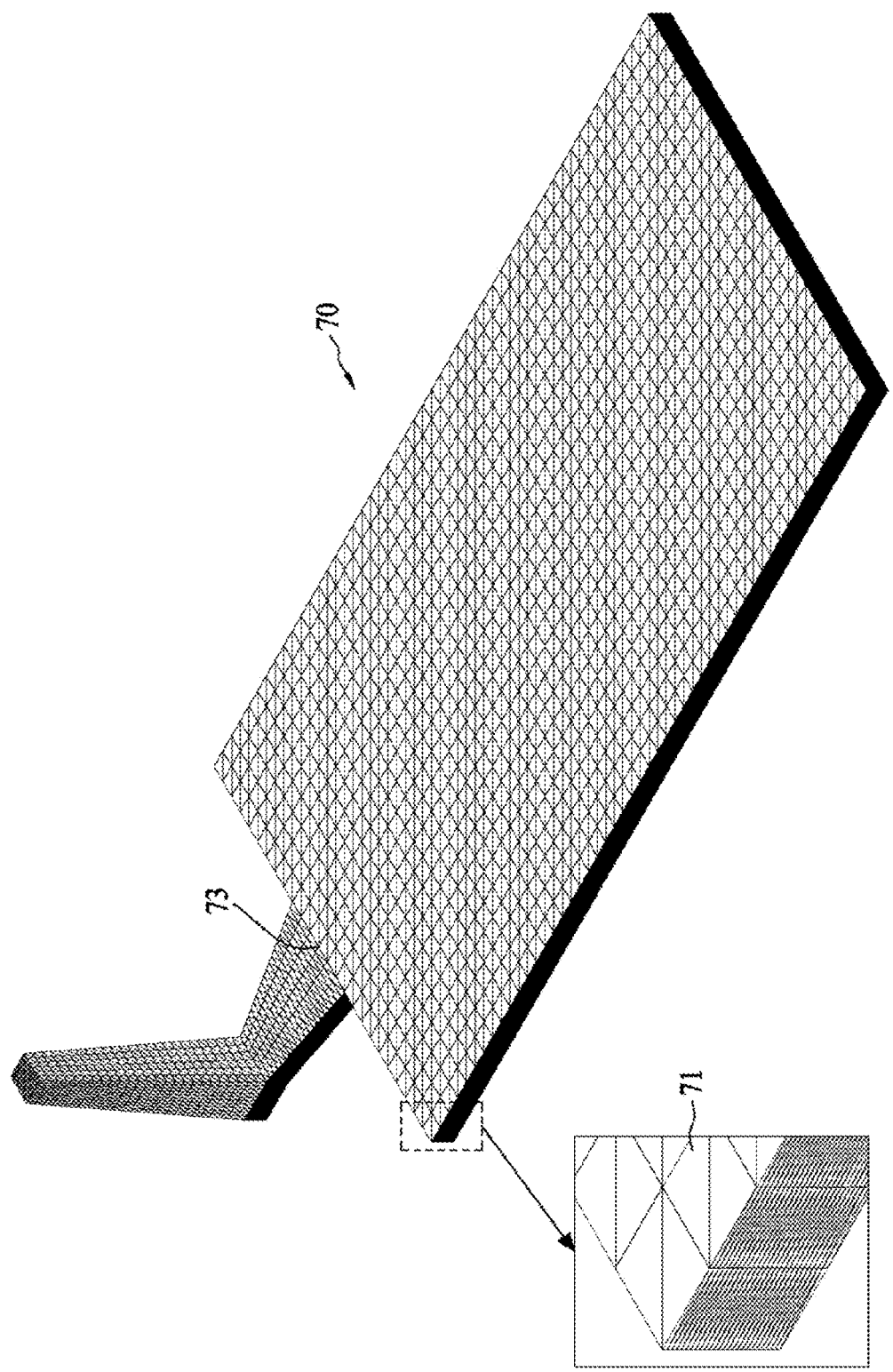

| | |
|---|---|
| Polymer | ABS |
| Grade Name | POLYFLAM RABS 90000 UV5 |
| Producer | A. Schulman |
| Comment | MVR(220,10)=30 cm3/10min ,D=1.2 g/cc |
| Last modified date | 2010/08/03 |
| | |
| Process condition | Process condition |
| Melt temperature (minimum) | 220 oC |
| Melt temperature (normal) | 235 oC |
| Melt temperature (maximum) | 250 oC |
| Mold temperature (minimum) | 40 oC |
| Mold temperature (normal) | 50 oC |
| Mold temperature (maximum) | 80 oC |
| Ejection temperature | 99.85 oC |
| Freeze temperature | 119.85 oC |

FIG. 7

| | |
|---|---|
| Polymer | PS |
| Grade Name | POLYFLAM SDR 101 |
| Producer | A. Schulman |
| Comment | MVR(200,5)=12 cm3/10min, D=1.06 g/cc |
| Last modified date | 2008/12/23 |
| | |
| Process condition | Process condition |
| Melt temperature (minimum) | 170 oC |
| Melt temperature (normal) | 200 oC |
| Melt temperature (maximum) | 210 oC |
| Mold temperature (minimum) | 30 oC |
| Mold temperature (normal) | 45 oC |
| Mold temperature (maximum) | 60 oC |
| Ejection temperature | 101.85 oC |
| Freeze temperature | 121.85 oC |

FIG. 36

| | | |
|---|---|---|
| Polymer | PMMA | |
| Grade Name | ALTUGLAS HFI-10 | |
| Producer | Arkema | |
| Comment | MFR(230,3.8)=3 g/10min,MVR(230,3.8)=2.9,D=1.15 g/cc | |
| Last modified date | 2007/12/21 | |
| | | |
| Process condition | Process condition | |
| Melt temperature (minimum) | 220 | °C |
| Melt temperature (normal) | 230 | °C |
| Melt temperature (maximum) | 240 | °C |
| Mold temperature (minimum) | 60 | °C |
| Mold temperature (normal) | 65 | °C |
| Mold temperature (maximum) | 70 | °C |
| Ejection temperature | 84.925 | °C |
| Freeze temperature | 104.925 | °C |

FIG. 38

MOLDING SYSTEM AND METHOD FOR OPERATING THE SAME

CROSS-REFERENCE TO RELATED APPLICATION

This patent application claims priority under 35 U.S.C. §119(e) from Provisional Patent Application No. 62/191,806, filed Jul. 13, 2015, the disclosure of which is incorporated by reference herein in its entirety, including all exhibits appended to Provisional Patent Application No. 62/191,806.

TECHNICAL FIELD

The present disclosure relates to a molding system and a method for operating the same, and more particularly, to a molding-condition setting method of a molding machine for preparing a molding resin product while taking into consideration a predicted in-mold PVT (Pressure-Specific Volume-Temperature) waveform of the molding resin.

DISCUSSION OF THE BACKGROUND

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold. In the conventional injection molding of synthetic resin by an injection molding machine, the weight of the injected synthetic resin varies with the molten resin pressure, the molten resin specific volume, the molten resin temperature or other molten resin conditions. Therefore, it is difficult to form products of a consistent quality.

In general, the setting of molding conditions of the injection molding machine requires a large number of trial molding operations and a long setting time because the setting work greatly depends on the know-how and experience of an operator of the injection molding machine, and various physical values affect one another as well.

Therefore, a virtual molding, i.e., computer-implemented simulation, by use of CAE (Computer-Assisted Engineering) is performed for the injection molding, and the molding conditions are then set based on the virtual molding. In virtual molding by use of CAE, phenomena will occur in a mold cavity within a short period of time, i.e., the result of simulation on resin temperature, pressure, shear rate, etc. can be reflected in molded products. Therefore, if the molding phenomena occurring within a mold cavity can be grasped accurately, using CAE may enable optimization of molding conditions and a stable molding of non-defective products.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a molding system and a method for operating a molding machine of the molding system, and more particularly, to a molding-condition setting method of a molding machine for preparing a molding product while taking into consideration a predicted in-mold PVT (Pressure-Specific Volume-Temperature) state waveform of a molding resin.

In some embodiments of the present disclosure, a method for operating a molding machine includes steps of specifying a simulating domain corresponding to a genuine domain in a mold disposed on the molding machine, wherein the genuine domain has a mold cavity to be filled with a molding resin from the molding machine to prepare a molding product; performing a virtual molding by using a setting packing pressure profile to generate a simulated state waveform expressing a relationship between an in-mold pressure and an in-mold temperature and a specific volume of the molding resin; generating a designed state waveform including an isobaric phase and an isochoric phase following the isobaric phase while taking into consideration the simulated state waveform; obtaining an updated packing pressure profile for applying a molding pressure to at least a portion of the genuine domain while taking into consideration a difference between the simulated state waveform and the designed state waveform; and setting the molding machine while taking into consideration the updated packing pressure profile to perform an actual molding by applying an actual molding pressure to the at least a portion of the genuine domain to prepare the molding product.

In some embodiments of the present disclosure, a molding system comprising a molding machine, a mold disposed on the molding machine, and a computing apparatus connected to the molding machine, wherein the computing apparatus is programmed to perform operations of specifying a simulating domain corresponding to a genuine domain in the mold, wherein the genuine domain has a mold cavity to be filled with a molding resin from the molding machine to prepare a molding product; performing a virtual molding by using a setting packing pressure profile to generate a simulated state waveform expressing a relationship between an in-mold pressure and an in-mold temperature and a specific volume of the molding resin; generating a designed state waveform including an isobaric phase and an isochoric phase following the isobaric phase while taking into consideration the simulated state waveform; obtaining an updated packing pressure profile for applying a molding pressure to at least a portion of the genuine domain while taking into consideration a difference between the simulated state waveform and the designed state waveform; and setting the molding machine while taking into consideration the updated packing pressure profile to perform an actual molding by applying an actual molding pressure to the at least a portion of the genuine domain to prepare the molding product.

In some embodiments of the present disclosure, the step of generating a designed state waveform comprises setting a specific volume of the isochoric phase while taking into consideration an ejection temperature of the molding resin at a normal pressure.

In some embodiments of the present disclosure, the step of generating a designed state waveform comprises setting a high pressure while taking into consideration a specific volume of the isochoric phase.

In some embodiments of the present disclosure, the step of generating a designed state waveform comprises setting a low pressure while taking into consideration the simulated state waveform substantially without a pressure drop.

In some embodiments of the present disclosure, the step of generating a designed state waveform comprises setting a packing pressure of the isobaric phase between the high pressure and the low pressure.

In some embodiments of the present disclosure, the step of generating a designed state waveform comprises checking if a transition temperature from the isobaric phase to the isochoric is higher than a gate-freezing temperature of the molding resin.

In some embodiments of the present disclosure, the step of obtaining an updated packing pressure profile comprises comparing the simulated state waveform and the designed state waveform in terms of a variation of the in-mold pressure with respect to a molding time.

In some embodiments of the present disclosure, the step of obtaining an updated packing pressure profile comprises comparing the simulated state waveform and the designed state waveform in terms of a variation of the in-mold pressure with respect to the in-mold temperature.

In some embodiments of the present disclosure, the step of obtaining an updated packing pressure profile comprises comparing the simulated state waveform and the designed state waveform in terms of a variation of an in-mold volume with respect to a molding time.

In some embodiments of the present disclosure, the method for operating a molding machine further comprises a step of repeating the virtual molding while taking into consideration the updated packing pressure profile to generate an updated state waveform of the molding resin.

The conventional operation of the injection molding may use a constant packing pressure to apply a pressure to the sprue portion of the mold, and the constant packing pressure could be a random value assigned by an operator of the molding machine according to the operator's experience. However, setting the packing pressure of the injection molding requires a large number of trial molding operations and a long setting time actually performed on the injection molding machine because the setting work greatly depends on the know-how and experience of an operator of the injection molding machine, and various physical values affect one another as well.

In the present disclosure, the size (volume) and the shape of the molding product will be substantially the same as the design if the molding resin is molded by using a designed state waveform. In other words, the shrinkage problem of the molding product can be effectively solved. The present disclosure generates a designed state waveform according to the properties of the molding resin, and implements the large number of trial molding operations by the molding simulation technique so as to obtain a packing pressure profile, which can generate a simulated state waveform substantially the same as the designed state waveform of the molding resin with the designed property (specific volume) in the mold. Subsequently, the molding machine is set while taking into consideration the packing pressure profile to apply an actual pressure to the at least a portion of the genuine domain so as to actually manufacture the molding product with the designed size (volume) and shape. In other words, the shrinkage problem of the molding product can be effectively solved, and the molding product can be manufactured precisely and accurately.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 6 is a schematic view of a simulating domain corresponding to the genuine domain in accordance with some embodiments of the present disclosure.

FIG. 7 shows a data sheet of the molding resin (acrylonitrile butadiene styrene, ABS) in accordance with some embodiments of the present disclosure.

FIG. 36 shows a data sheet of the molding resin (polystyrene, PS) in accordance with some embodiments of the present disclosure.

FIG. 38 shows a data sheet of the molding resin (polymethylmethacrylate, PMMA) in accordance with some embodiments of the present disclosure.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments of the present disclosure," "an embodiment," "exemplary embodiment," "other embodiments of the present disclosure," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system and a method for setting a molding machine of the molding system and non-transitory computer medium for use in a molding process performed by a molding machine. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
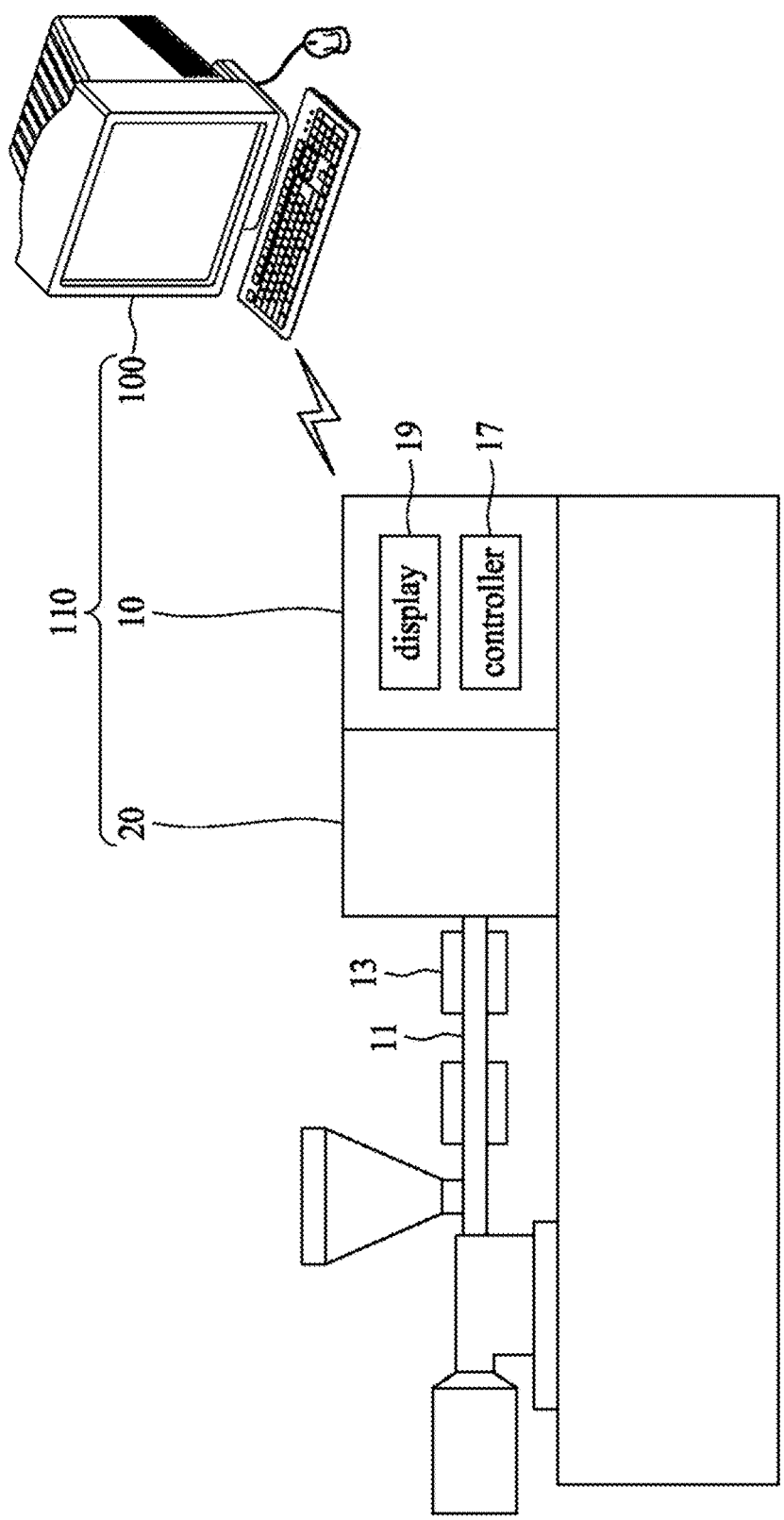
FIG. 1 and FIG. 2 are schematic views of an injection molding machine equipped with a metal mold in accordance with some embodiments of the present disclosure.

FIG. 1 is a schematic view of an injection molding system 110 in accordance with various embodiments of the present disclosure. The injection molding system 110 comprises a molding machine 10 such as an injection molding machine, a mold 20 disposed on the molding machine 10, and a computing apparatus 100 connected to the injection molding machine 10. In some embodiments of the present disclosure, the injection molding machine 10 includes a screw chamber 11, heating elements 13 configured to heat the screw chamber 11, and a screw 15 positioned in the screw chamber 11 and driven by a screw-driving motor 12 for feeding a molding resin 16, such as thermoplastics, into a mold cavity 25 of the metal mold 20. In some embodiments of the present disclosure, the molding machine 10 has a controller 17 configured to control the operation of the injection molding machine 10 and a display 19 configured to display information of the injection molding process.

In some embodiments of the present disclosure, the injection molding machine 10 is equipped with sensors for sensing the velocity of the screw 15, the pressure of the barrel 11 in the filling stage (filling pressure) and the temperature of the barrel 11 in the filling stage (filling temperature); and the computing apparatus 100 is programmed to acquire the velocity and pressure data from the controller 17 through the association therebetween.

Figure 2:
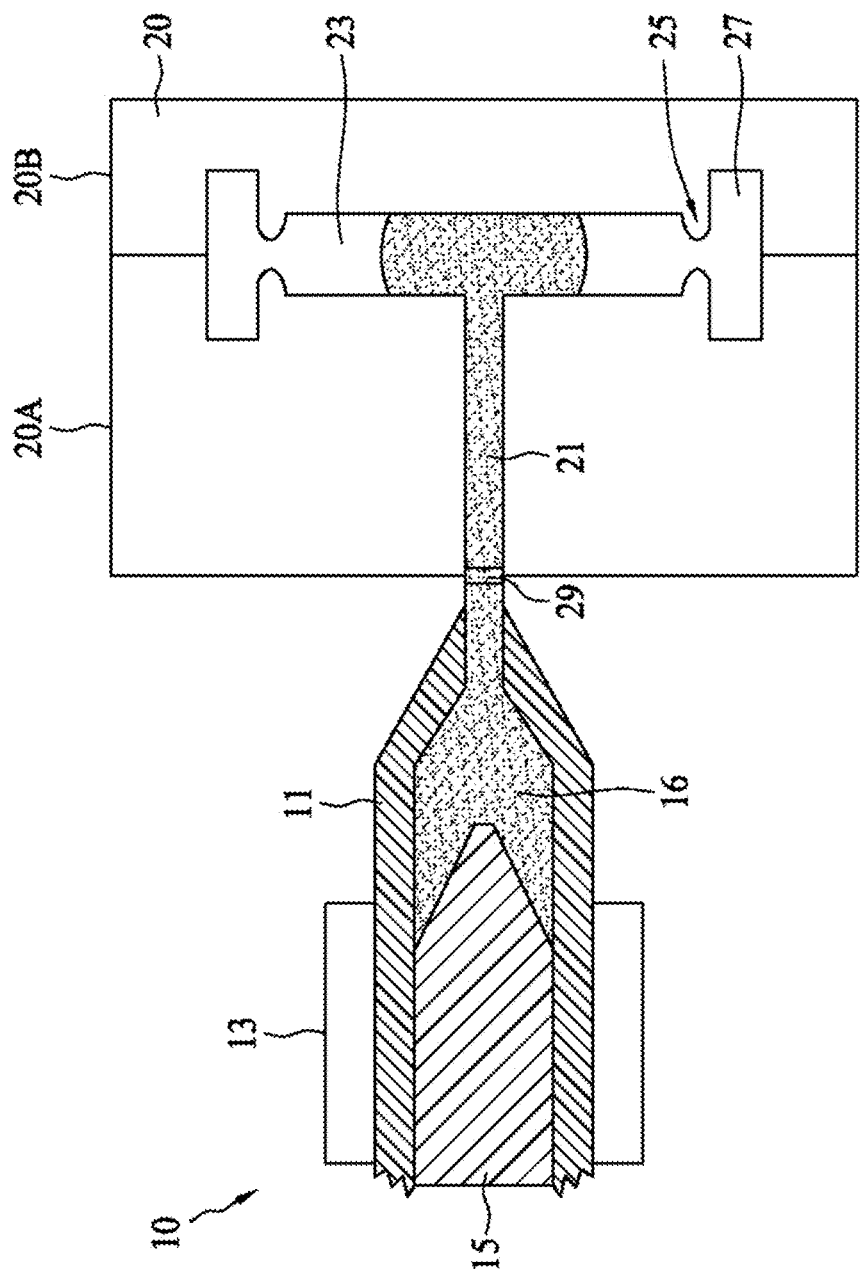

FIG. 2 is a schematic view of the mold 20 in FIG. 1. The metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

Figure 3:
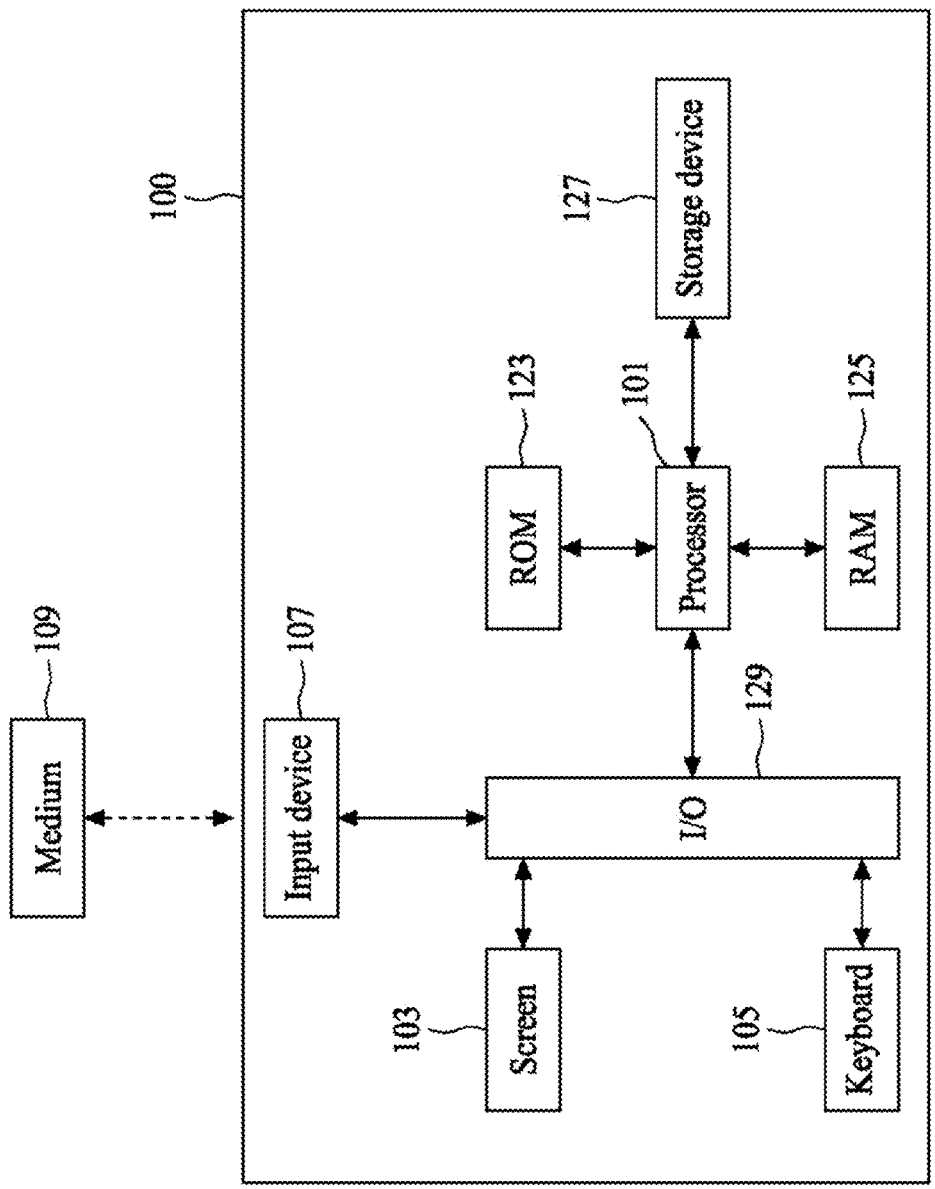
FIG. 3 is a functional block diagram of a computing apparatus in accordance with some embodiments of the present disclosure.

FIG. 3 is a functional block diagram of a computing apparatus 100 in accordance with some embodiments of the present disclosure. In some embodiments of the present disclosure, the computing apparatus 100 comprises a computer processor 101 for performing a computer-implemented injection molding simulation method. In some embodiments of the present disclosure, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a screen 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory device, i.e., the ROM 123 and the RAM 125, can be programmed to store codes for performing the computer-implemented injection molding simulation method.

Figure 4:
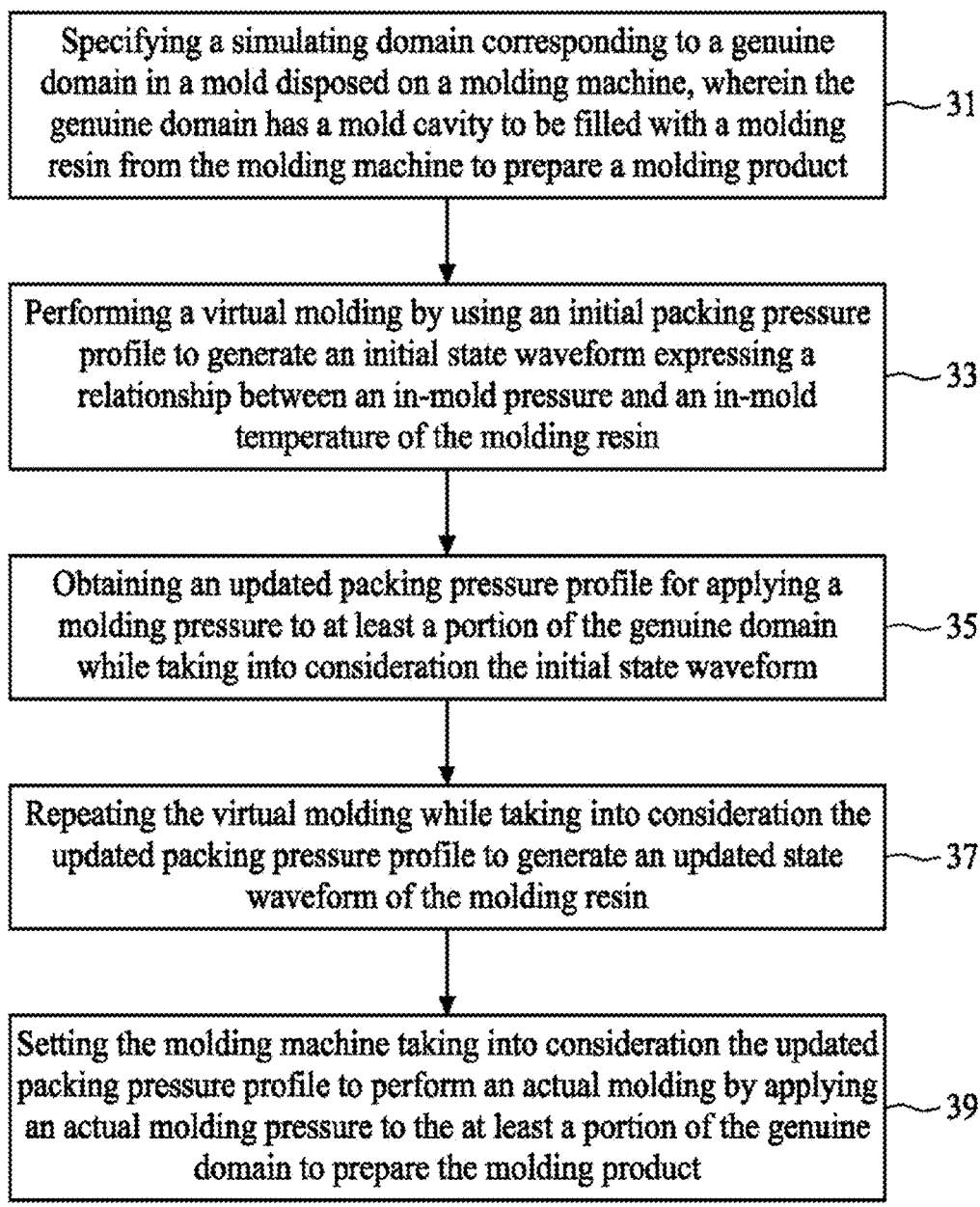
FIG. 4 is a flow chart of the method for operating a molding machine in accordance with some embodiments of the present disclosure.

FIG. 4 is a flow chart of the method 30 for operating a molding machine in accordance with some embodiments of the present disclosure. The method can be considered a molding-condition setting method for the molding machine, which comprises a step 31 of specifying a simulating domain, wherein the simulating domain corresponds to a genuine domain in a mold disposed on a molding machine, wherein the genuine domain has a mold cavity to be filled with a molding resin from the molding machine to prepare a molding product; a step 33 of performing a virtual molding by using a setting packing pressure profile to generate a simulated state waveform expressing a relationship between an in-mold pressure and an in-mold temperature and a specific volume of the molding resin; a step 35 of generating a designed state waveform including an isobaric phase and an isochoric phase following the isobaric phase while taking into consideration the simulated state waveform; a step 37 of obtaining an updated packing pressure profile for applying a molding pressure to at least a portion of the genuine domain while taking into consideration a difference between the simulated state waveform and the designed state waveform; and a step 39 of setting the molding machine while taking into consideration the updated packing pressure profile to perform an actual molding by applying an actual molding pressure to the at least a portion of the genuine domain to prepare the molding product.

The following describes an exemplary process flow of the method 30 in accordance with some embodiments of the present disclosure.

Figure 5:
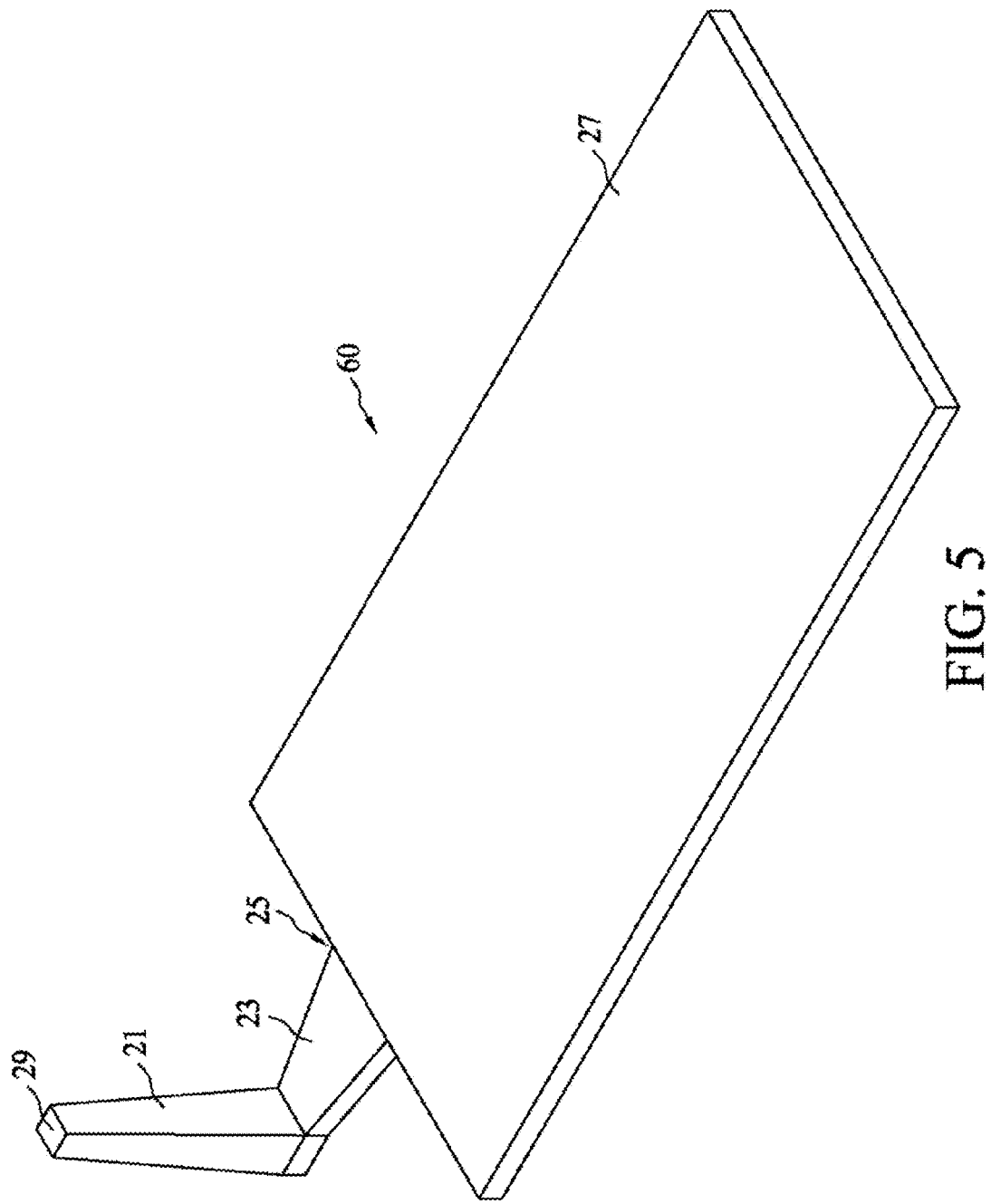
FIG. 5 is a schematic view of a genuine domain in accordance with some embodiments of the present disclosure.

FIG. 5 is a schematic view of a genuine domain 60 in accordance with some embodiments of the present disclosure. Referring back to FIG. 2, the metal mold 20 may be divided into two parts: a metal part and space part defined by the metal part. The genuine domain 60 is an example of the space part of the metal mold 20. In some embodiments of the present disclosure, the method 30 can begin in the step 31 where a simulating domain is specified. In some embodiments of the present disclosure, the simulating domain is obtained from a CAD (Computer Aided Design) model used in design and development of a product.

FIG. 6 is a schematic view of a simulating domain 70 corresponding to the genuine domain 60 in accordance with some embodiments of the present disclosure. In some embodiments of the present disclosure, a mesh is created by dividing at least part of the simulating domain 70 before actually applying a numerical analysis, such as an FEM (finite element method), an FDM (finite difference method) or an FVM (finite volume method), to the simulating domain 70. The creation of the mesh for the simulating domain 70 is a technique of modeling an object or fluid region (i.e., the simulating domain 70 of the present embodiment) to be analyzed with a set of elements 71, such as rectangular mesh, hexahedral mesh or tetrahedral mesh, in order to perform the subsequent numerical analysis.

FIG. 7 shows a data sheet of the molding resin in accordance with some embodiments of the present disclosure. In some embodiments of the present disclosure, the molding resin is acrylonitrile butadiene styrene (ABS) resin having an ejection temperature of 99.85° C. and a freezing temperature of 119.85° C.

In the step 33, a simulation process is performed to simulate an injection molding process of a molding resin that is injected into the simulating domain 70. In some embodiments of the present disclosure, the simulation process includes a virtual molding performed to generate a state waveform expressing a relationship between an in-mold pressure and an in-mold temperature and a specific volume of the molding resin. In some embodiments of the present disclosure, the designed state waveform represents the variation of a specific volume of the molding resin with respect to the in-mold pressure and the in-mold temperature during a single shot of the injection molding process.

Figure 8:
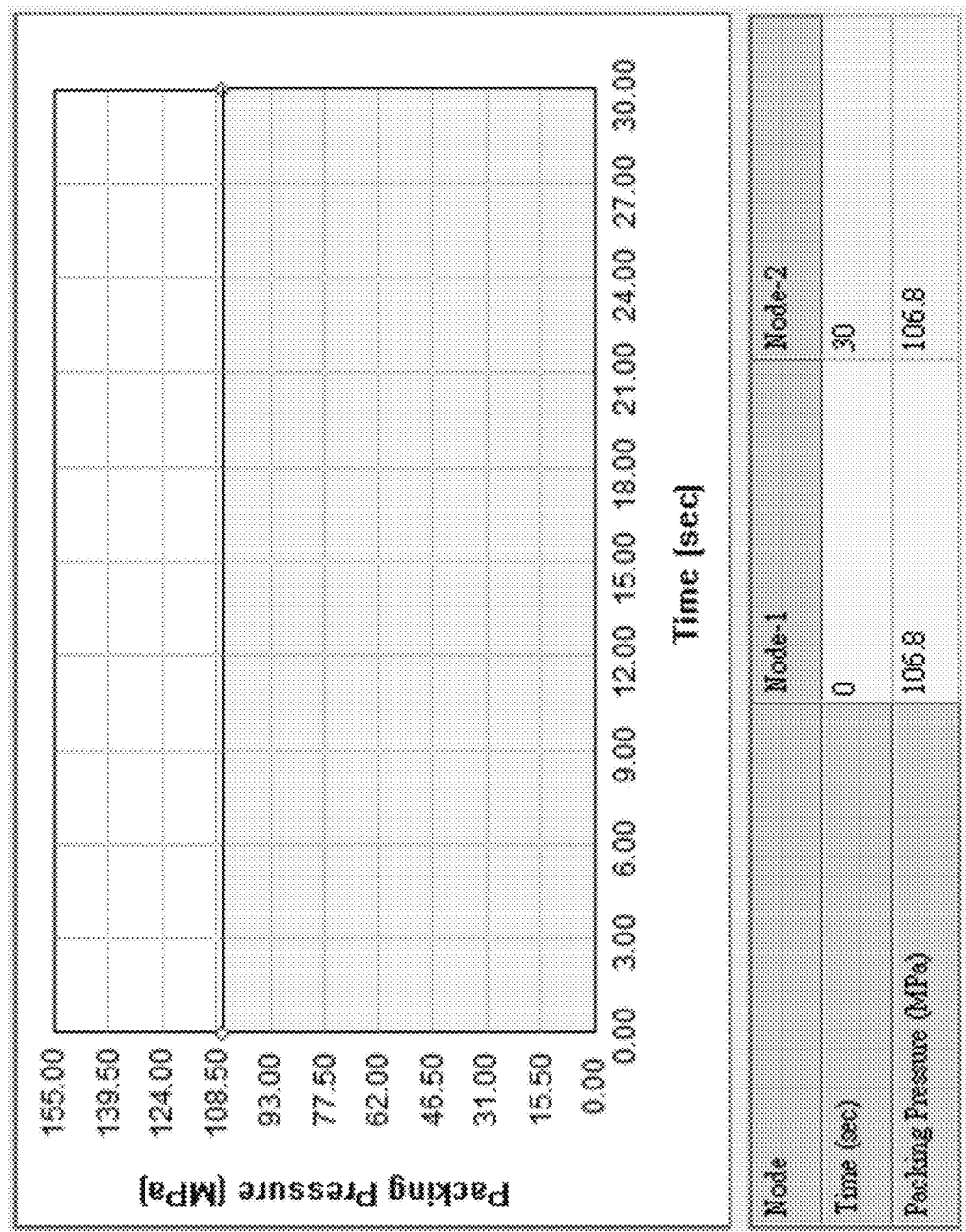
FIG. 8 is a schematic plot showing an initial setting packing pressure profile to be applied to at least a portion of the genuine domain in accordance with some embodiments of the present disclosure.

FIG. 8 is a schematic plot showing an initial setting packing pressure profile to be applied to at least a portion of the genuine domain 60 in accordance with some embodiments of the present disclosure. In some embodiments of the present disclosure, the simulation process uses the packing pressure profile for simulating the application of a packing pressure to the nozzle 29 of the genuine domain 60 by the screw 15 of the molding machine. In some embodiments of the present disclosure, the packing pressure profile may be a single pressure value (e.g., the initial packing pressure, 106.8 MPa in FIG. 8), which can be obtained according to the experience of an operator of the injection molding machine 10. In some embodiments of the present disclosure, the packing pressure profile may be a waveform with varying pressure values, which can be obtained from the injection molding machine 10 after a trial molding operation. In some embodiments of the present disclosure, the packing pressure profile may be a waveform with varying pressure values, which is obtained from a trial simulation process of the injection molding operation.

The molding phenomena of the molding resin 16 can be simulated by using the following governing equations (1)-(4):

$$\frac{\partial \rho}{\partial t} + \nabla \cdot \rho u = 0 \tag{1}$$

$$\frac{\partial}{\partial t}(\rho u) + \nabla \cdot (\rho uu + \tau) = -\nabla p + \rho g \tag{2}$$

$$\frac{\partial}{\partial t}(T\rho C_P) + \nabla \cdot (\rho u C_P T) = k\nabla^2 T + \eta \dot{\gamma}^2 \tag{3}$$

$$\tau = -\eta(T, \dot{\gamma}) \cdot (\nabla u + \nabla u^T) \tag{4}$$

where u represents the velocity vector (flow velocity), T represents the temperature, t represents the time, p represents the pressure, $\tau$ represents the total stress tensor, $\rho$ represents the density, $\eta$ represents the viscosity, k represents the thermal conductivity, $C_P$ represents the specific heat, and $\dot{\gamma}$ represents the shear rate.

In one embodiment of the present disclosure, in the step 33, solving the governing equations (1)-(4) uses the pressure of the packing pressure profile in FIG. 8 to set the boundary conditions of the governing equations (1)-(4) at the nozzle 29 of the genuine domain 60. Solving the governing equations (1)-(4) requires the transient state analysis (virtual molding), which can be performed numerically by using a computing apparatus. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference. During the transient state analysis, the process variables that change with time are not zero; i.e., the partial derivatives (∂/∂t) in the governing equations (1)-(4) are not considered zero.

Figure 9:
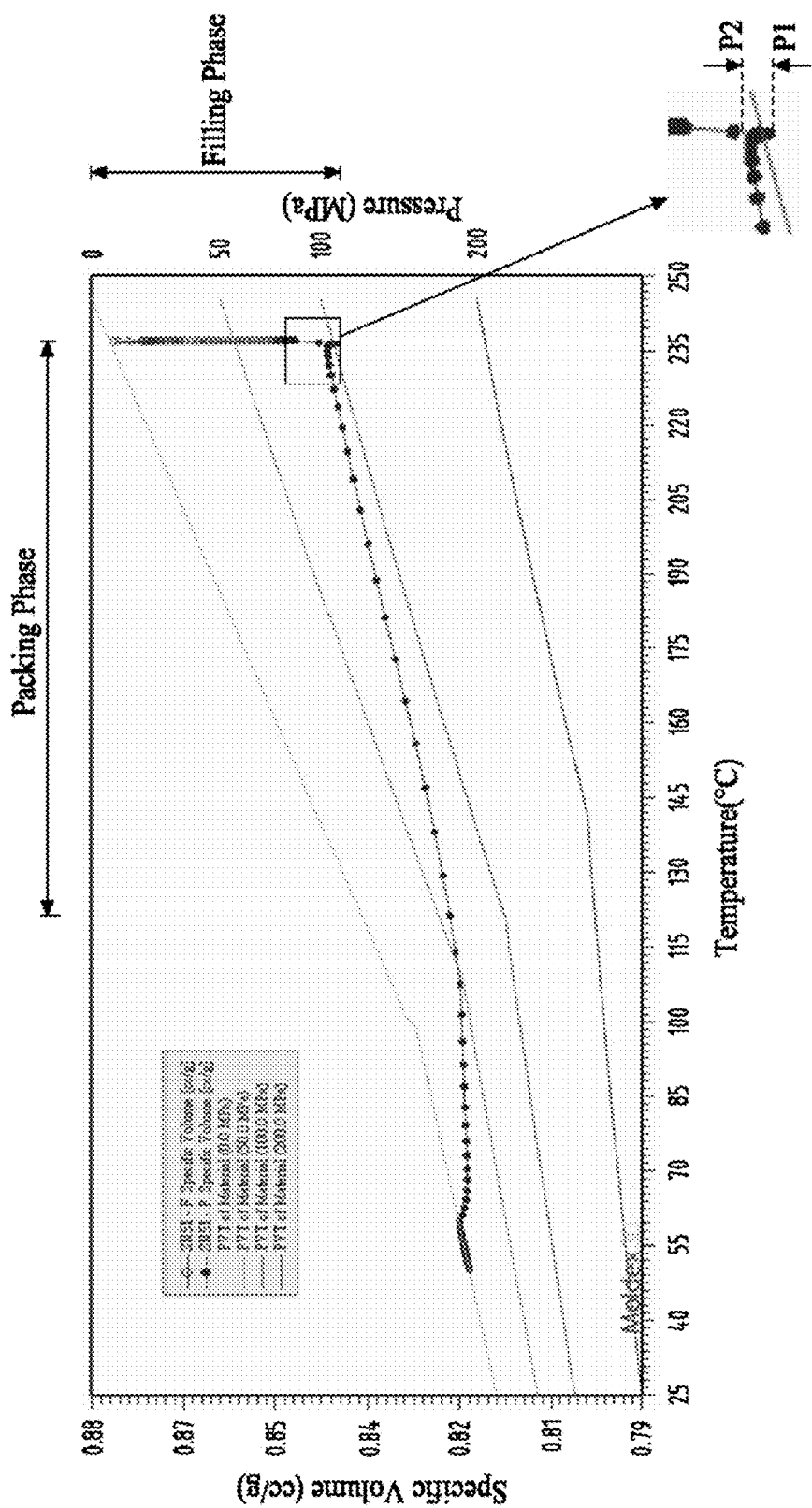
FIG. 9 is a schematic plot showing a state waveform of a portion of the simulating domain from the virtual molding in accordance with some embodiments of the present disclosure.

FIG. 9 is a schematic plot showing a simulated state waveform of a portion of the simulating domain 70 from the virtual molding using the initial setting packing pressure profile in FIG. 8 in accordance with some embodiments of the present disclosure. In some embodiments of the present disclosure, in the step 33, solving the governing equations (1)-(4) by the transient state analysis generates the designed state waveform as shown in FIG. 9, expressing a relationship between an in-mold pressure and an in-mold temperature and a specific volume of the molding resin 16 at a sensing node (SN) 73 of the simulating domain 70 shown in FIG. 6, wherein the sensing node 73 corresponds to a portion of the mold cavity 27 around the gate portion 25 in FIG. 5. In some embodiments of the present disclosure, the designed state (PVT) waveform may optionally express the pressure (P), the specification volume (V), or the temperature (T) of the molding resin 16 at any portion of the mold cavity 27.

Referring to FIG. 9, in some embodiments of the present disclosure, the designed state waveform includes a filling phase and a packing phase following the filling phase, and a transition node (e.g., the beginning of the packing phase right after the filling phase) has an initial holding pressure (P1) between the filling phase and the packing phase, wherein a dropping pressure (P2) is also depicted in a close-up view of FIG. 9. The dropping pressure (P2) physically means that the molding resin 16 flows from the interior of the mold cavity 27 back to the runner portion 23, opposite to the filling phase where the molding resin 16 flows from the runner portion 23 toward the interior of the mold cavity 27.

Figure 10:
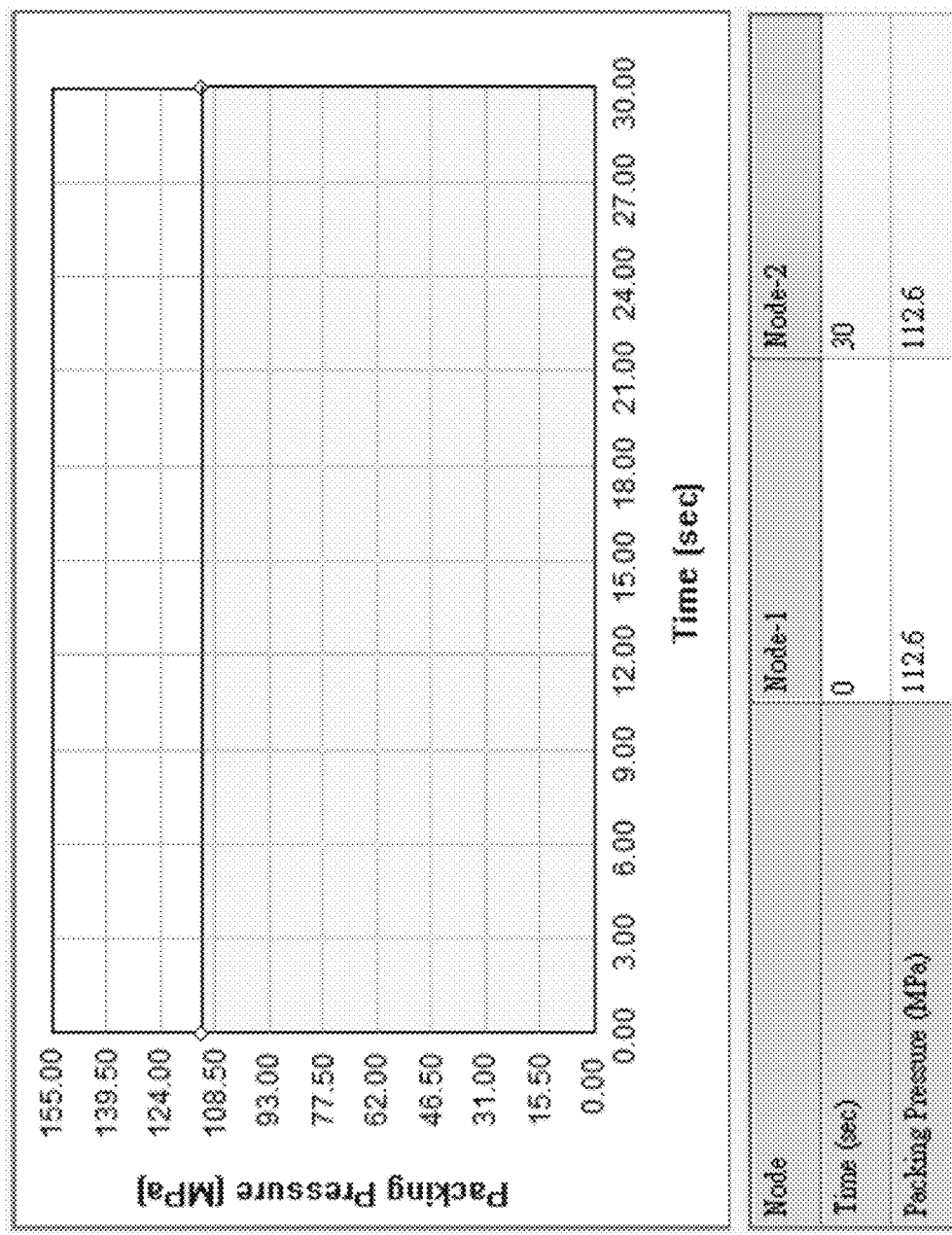
FIG. 10 is a schematic plot showing a setting packing pressure profile to be applied to at least a portion of the genuine domain in accordance with some embodiments of the present disclosure.

FIG. 10 is a schematic plot showing a setting packing pressure profile to be applied to at least a portion (the nozzle 29) of the genuine domain 60 in accordance with some embodiments of the present disclosure. In some embodiments of the present disclosure, when the simulated state waveform has a pressure drop (ΔP=P1−P2) larger than a predetermined range (for example, 5% of the initial pressure, i.e., P1) around the transition node (in this example, P1=101.1 MPa, P2=95.9 MPa), a backflow adjusting process is performed to generate a new holding pressure while taking into consideration the pressure drop (ΔP). In some embodiments of the present disclosure, the new holding pressure (112.6 MPa) is calculated by a formula ($P_{h1}$+(ΔP)/P1)*$P_{h1}$), where $P_{h1}$ represents the initial holding pressure (106.8 MPa) of the packing pressure profile in FIG. 8.

Figure 11:
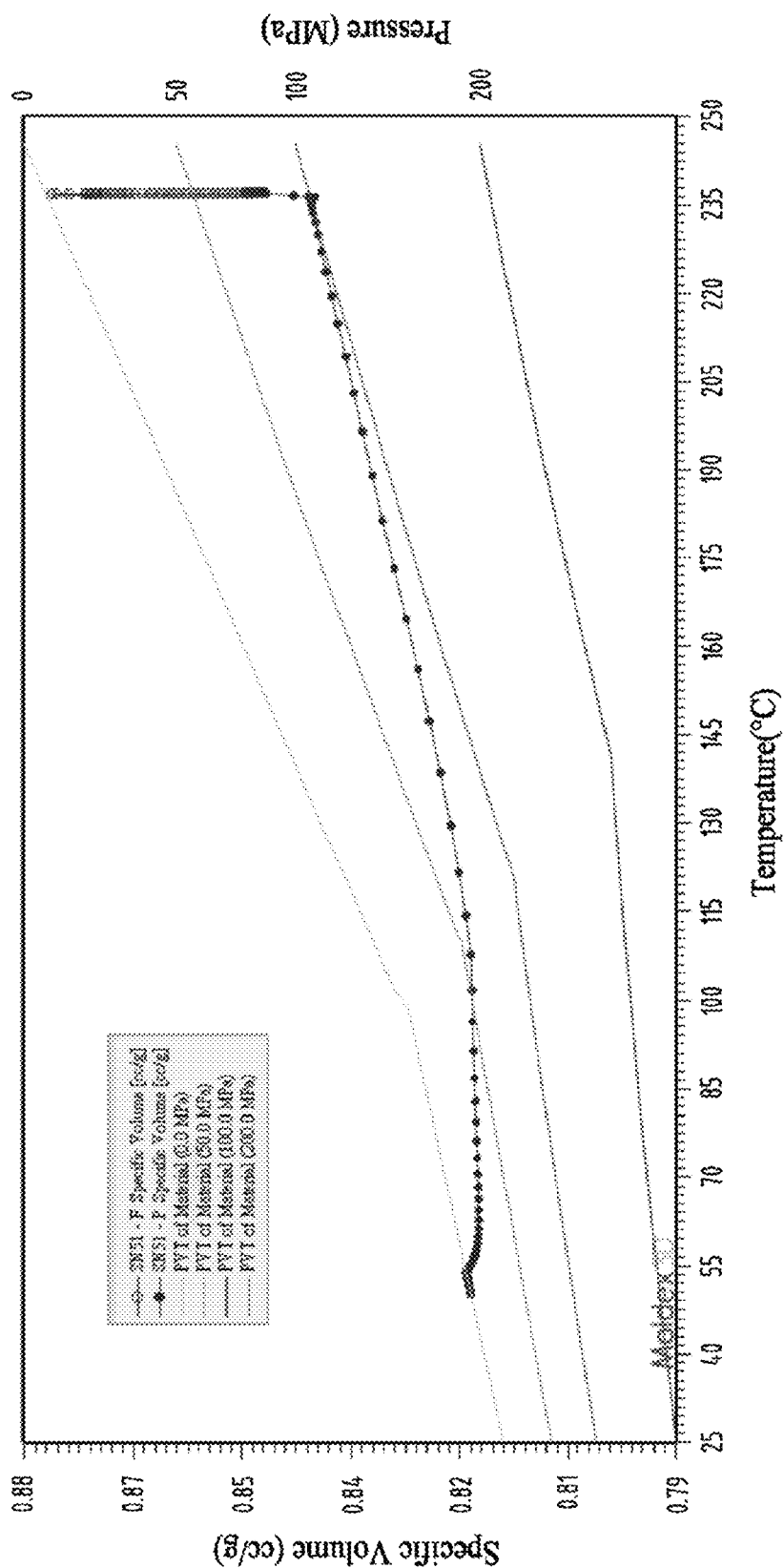
FIG. 11 is a schematic plot showing a simulated state waveform of a portion of the simulating domain from the virtual molding using the initial setting packing pressure profile in FIG. 10 in accordance with some embodiments of the present disclosure.

FIG. 11 is a schematic plot showing a simulated state waveform of a portion (sensing node 73) of the simulating domain 70 from the virtual molding using the setting packing pressure profile in FIG. 10 in accordance with some embodiments of the present disclosure. Comparing FIG. 11 with FIG. 9, it is obvious that the pressure drop problem has been rectified.

In the step 35, a designed state waveform is generated while taking into consideration the simulated state waveform, wherein the designed state waveform includes an isobaric phase and an isochoric phase following the isobaric phase. In some embodiments of the present disclosure, if the molding resin is molded by using the designed state waveform, the size (volume) and the shape of the molding product will be substantially the same as the design. In other words, the shrinkage problem of the molding product can be effectively solved, and the molding product can be manufactured precisely and accurately.

Figure 12:
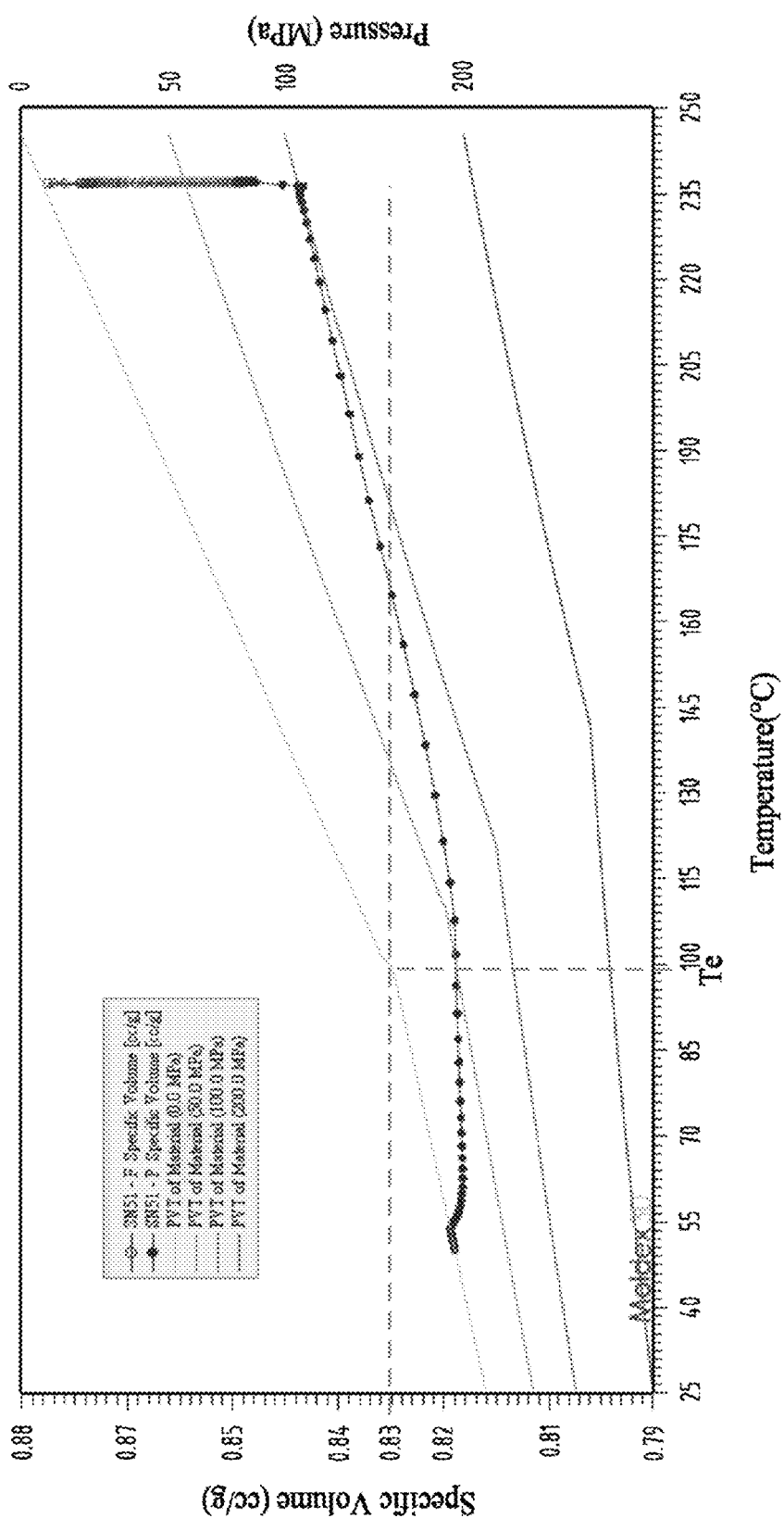
FIG. 12 is a schematic plot for generating a portion of the designed state waveform in accordance with some embodiments of the present disclosure.

FIG. 12 is a schematic plot for generating a portion of the designed state waveform in accordance with some embodiments of the present disclosure. In some embodiments of the present disclosure, generating the designed state waveform comprises setting a specific volume of the isochoric phase while taking into consideration the ejection temperature of the molding resin at a normal pressure. Referring to FIG. 7, in some embodiments of the present disclosure, the ejection temperature (Te) of the molding resin (ABS) is 99.85° C., and the specific volume of the isochoric phase is set to be 0.83 cc/g, which is the intersection of the ejection temperature (99.85° C.) and the normal pressure (0.0 MPa).

Figure 13:
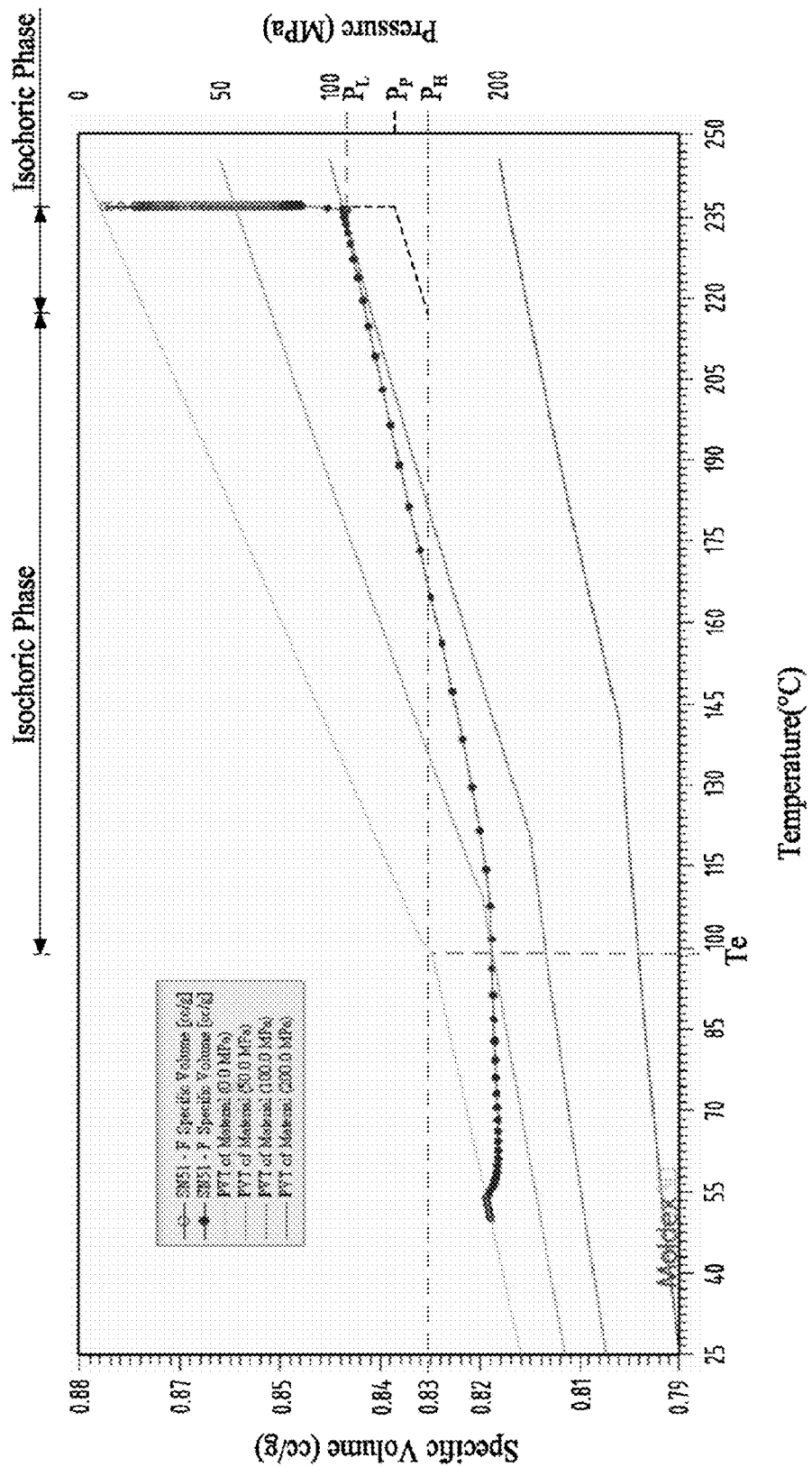
FIG. 13 is a schematic plot for generating a portion of the designed state waveform in accordance with some embodiments of the present disclosure.

FIG. 13 is a schematic plot for generating a portion of the designed state waveform in accordance with some embodiments of the present disclosure. In some embodiments of the present disclosure, generating the designed state waveform comprises setting a high pressure ($P_H$) while taking into consideration a specific volume of the isochoric phase; setting a low pressure ($P_L$) while taking into consideration the simulated state waveform, which substantially does not have a pressure drop; and setting a packing pressure of the isobaric phase between the high pressure ($P_H$) and the low pressure ($P_L$). In some embodiments of the present disclosure, the method sets the high pressure ($P_H$) by using the pressure corresponding to the specific volume of the isochoric phase, sets the low pressure ($P_L$) by using the pressure at the beginning of the simulated state waveform substantially without a pressure drop, and sets the packing pressure ($P_r$) of the isobaric phase by a formula ($P_L$+2*($P_H$−$P_L$)/3)).

Figure 14:
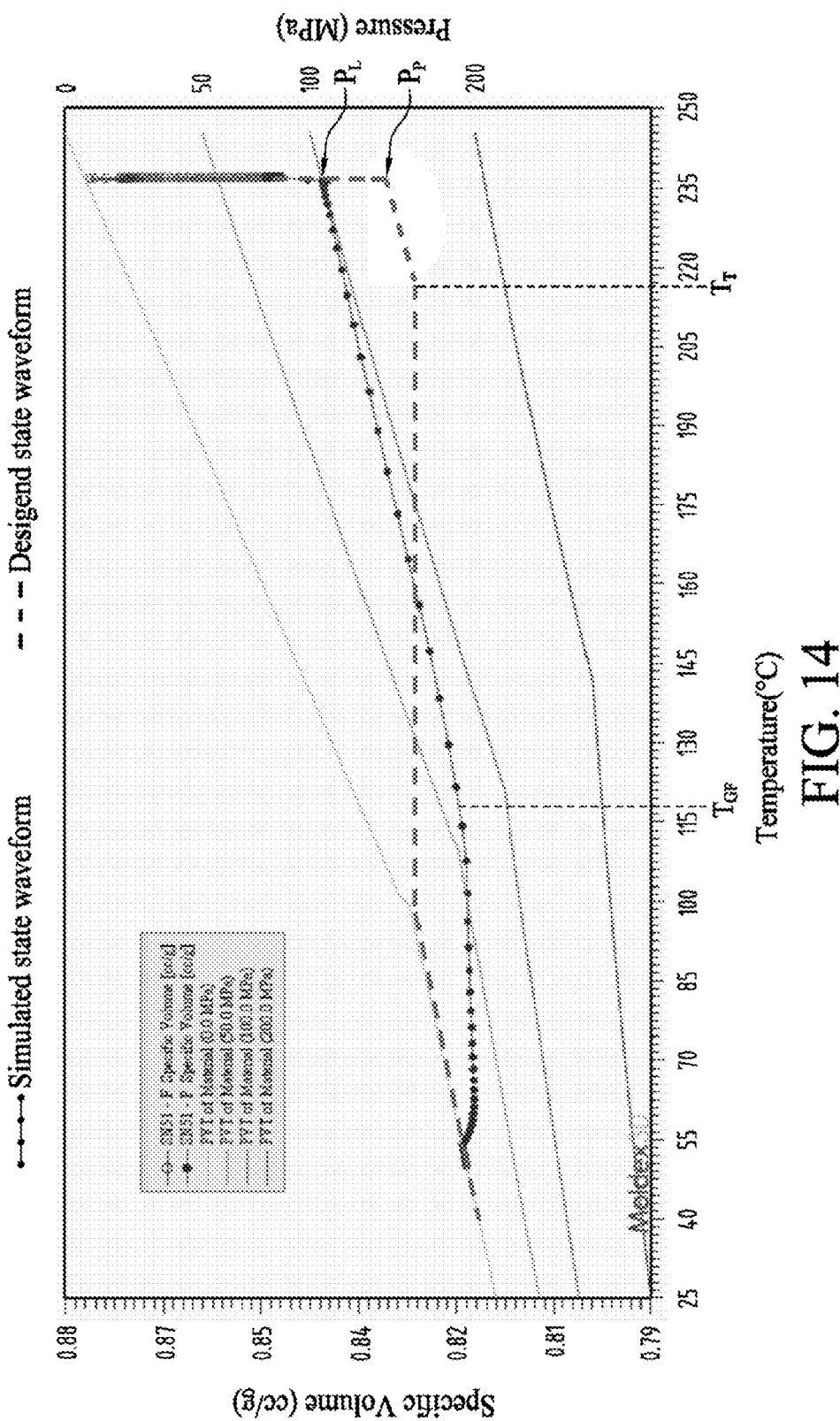
FIG. 14 a schematic plot showing the designed state waveform in accordance with some embodiments of the present disclosure.

FIG. 14 is a schematic plot showing the designed state waveform in accordance with some embodiments of the present disclosure. In some embodiments of the present disclosure, combining the isochoric phase in FIG. 12 and the isobaric phase in FIG. 13 forms the designed state waveform. In some embodiments of the present disclosure, the method further checks if a transition temperature from the isobaric phase to the isochoric is higher than a gate-freezing temperature ($T_{GF}$) of the molding resin; referring to FIG. 14, it is obvious that the transition temperature ($T_T$) is higher than the gate-freezing temperature ($T_{GF}$). In addition, FIG. 14 also shows the simulated state waveform as well as the designed state waveform, and one can compare the simulated state waveform to the designed state waveform to check the difference between the simulated state waveform and the designed state waveform.

Figure 15:
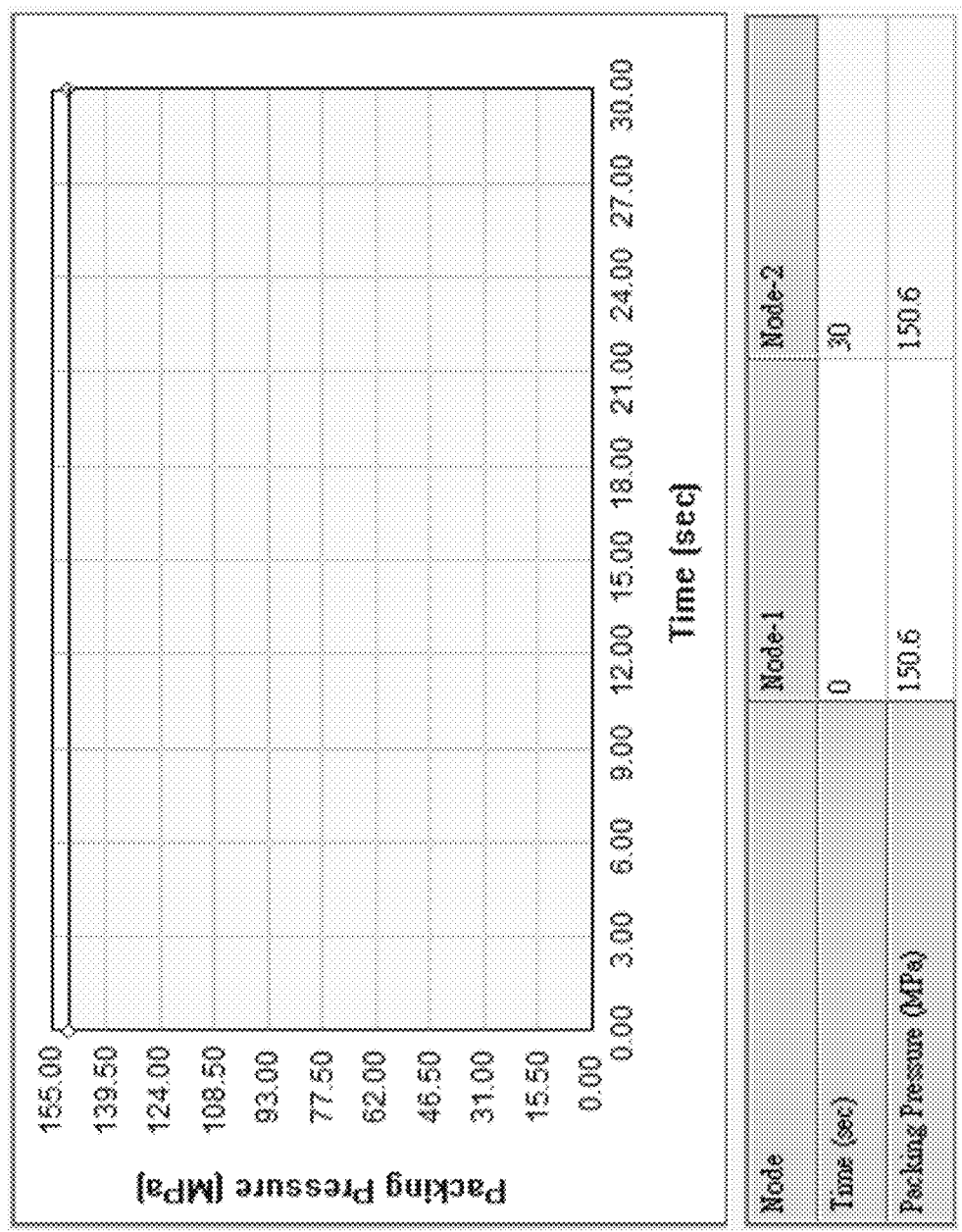
FIG. 15 is a schematic plot showing an updated packing pressure profile to be applied to at least a portion of the genuine domain in accordance with some embodiments of the present disclosure.

FIG. 15 is a schematic plot showing an updated packing pressure profile to be applied to at least a portion of the genuine domain 60 in accordance with some embodiments of the present disclosure. Referring back to FIG. 4, in the step 37, an updated packing pressure profile is obtained for applying a molding pressure to at least a portion of the genuine domain, while obtaining the updated packing pressure profile takes into consideration a difference between the simulated state waveform and the designed state waveform. In some embodiments of the present disclosure, the following operations are performed to adjust the packing pressure profile such that the simulated state waveform fits with the designed state waveform as close as possible; consequently, the molding machine 10 can use the nozzle 29 of the genuine domain 60, and the size (volume) and the shape of the molding product will be substantially the same as the design. In other words, the shrinkage problem of the molding product can be effectively solved, and the molding product can be manufactured precisely and accurately.

Referring to FIG. 14, in some embodiments of the present disclosure, the maximum packing pressure of the simulated state waveform is 102.2 MPa, while the maximum packing pressure of the designed state waveform is 136.7 MPa. In some embodiments of the present disclosure, the new packing pressure ($P_{new}$=150.6 MPa) of the packing pressure profile in FIG. 15 is generated by a formula $P_{new}$(Pd/Ps)*$P_{old}$), where Pd (136.7 MPa) is the maximum packing pressure of the designed state waveform in FIG. 14, Ps (102.2 MPa) is maximum packing pressure of the simulated state waveform in FIG. 14, and Pp (112.6 MPa) is the packing pressure of the previous packing pressure profile in FIG. 10.

Figure 16:
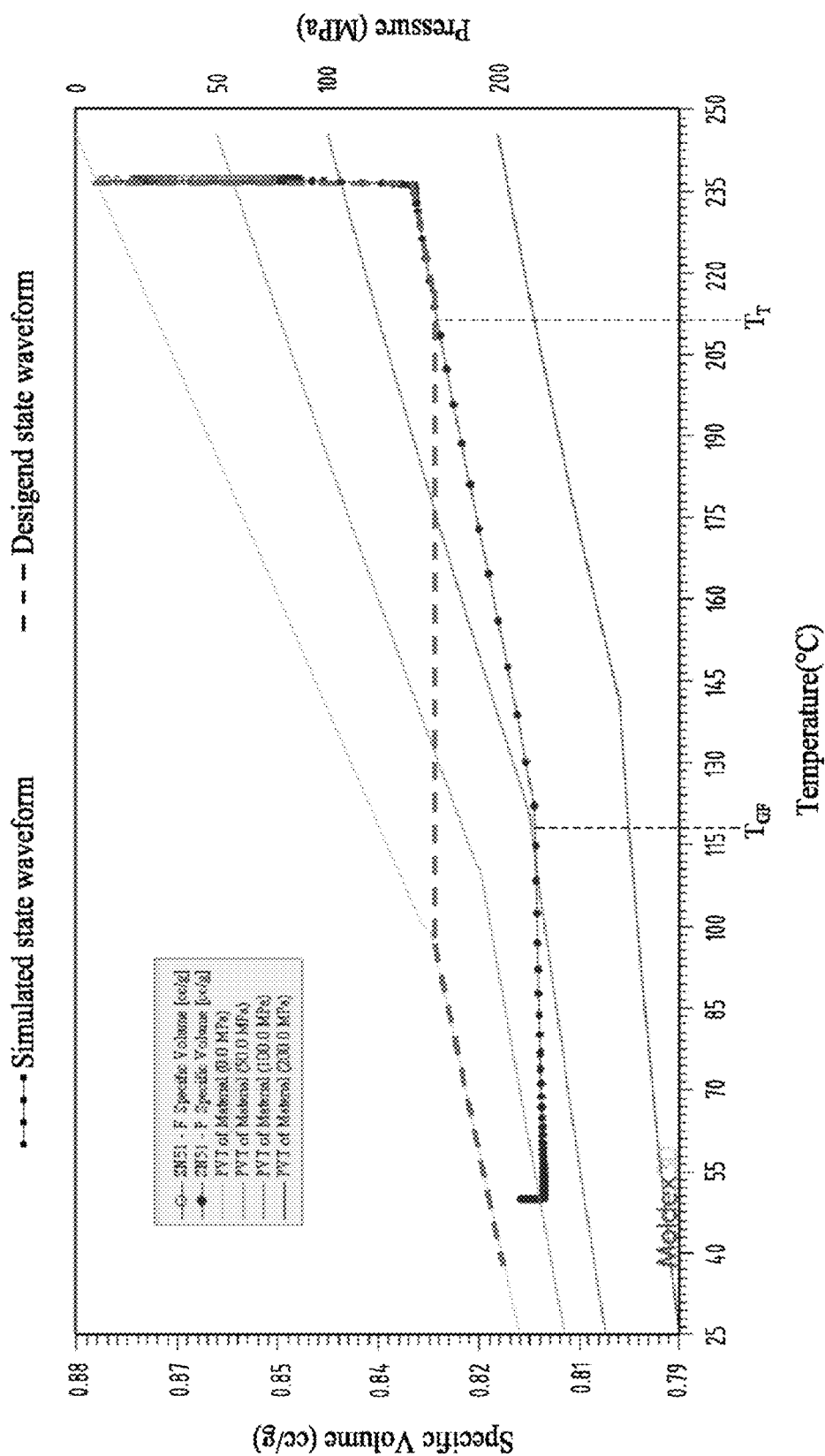
FIG. 16 is a schematic plot showing a simulated state waveform of a portion of the simulating domain from the virtual molding using the packing pressure profile in FIG. 15 in accordance with some embodiments of the present disclosure.

FIG. 16 is a schematic plot showing a simulated state waveform of a portion (sensing node 73) of the simulating domain 70 from the virtual molding using the packing pressure profile in FIG. 15 in accordance with some embodiments of the present disclosure, wherein the designed state waveform is also shown in FIG. 16 for comparison with the simulated state waveform. Obviously, the simulated state waveform still deviates from the designed state waveform; in other words, the packing pressure profile needs further adjustment.

Figure 17:
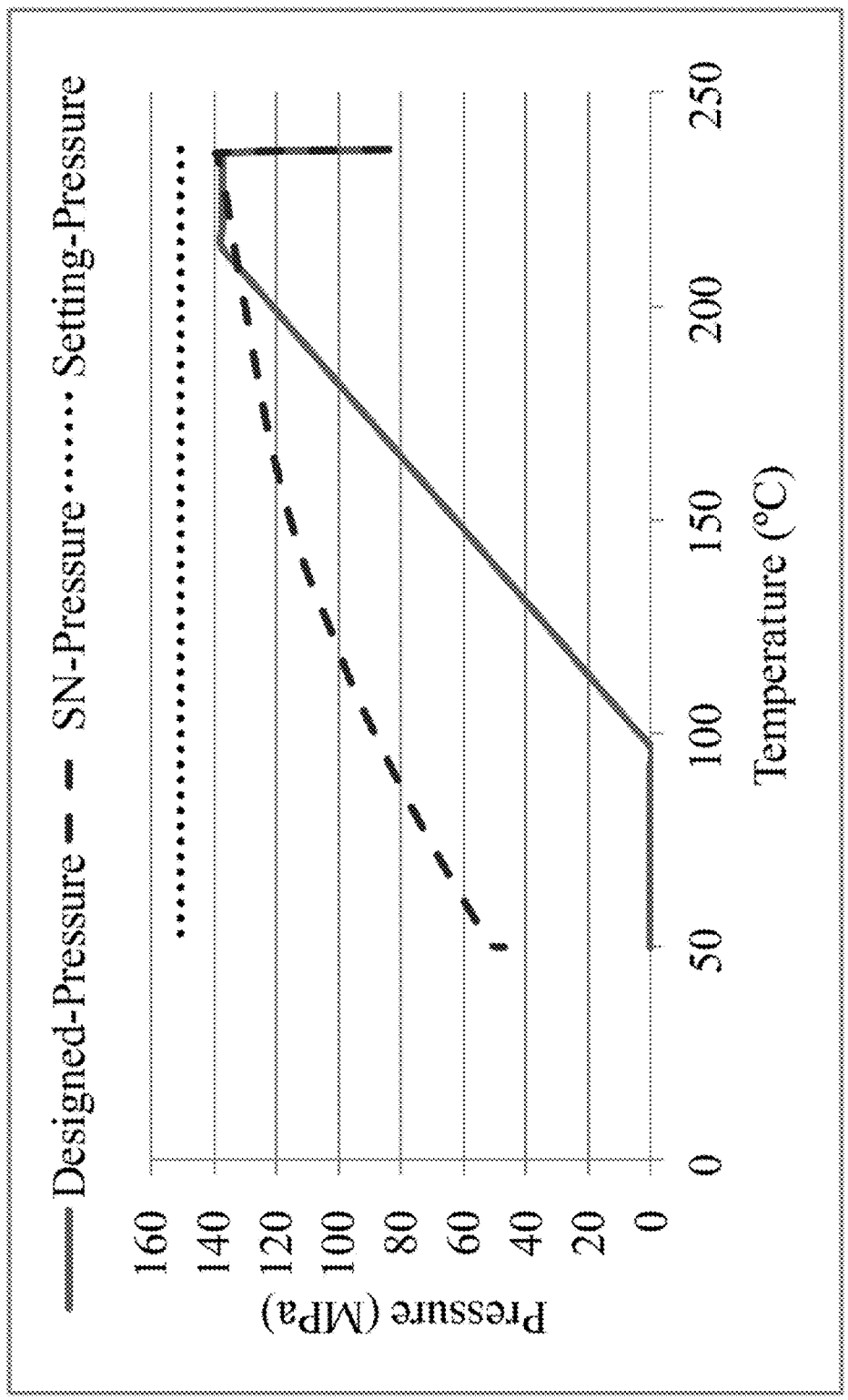
FIG. 17 is a schematic plot showing the comparison of the simulated state waveform and the designed state waveform in terms of a variation of the in-mold pressure (SN-pressure) at the sensing node with respect to the in-mold temperature in accordance with some embodiments of the present disclosure.
Figure 18:
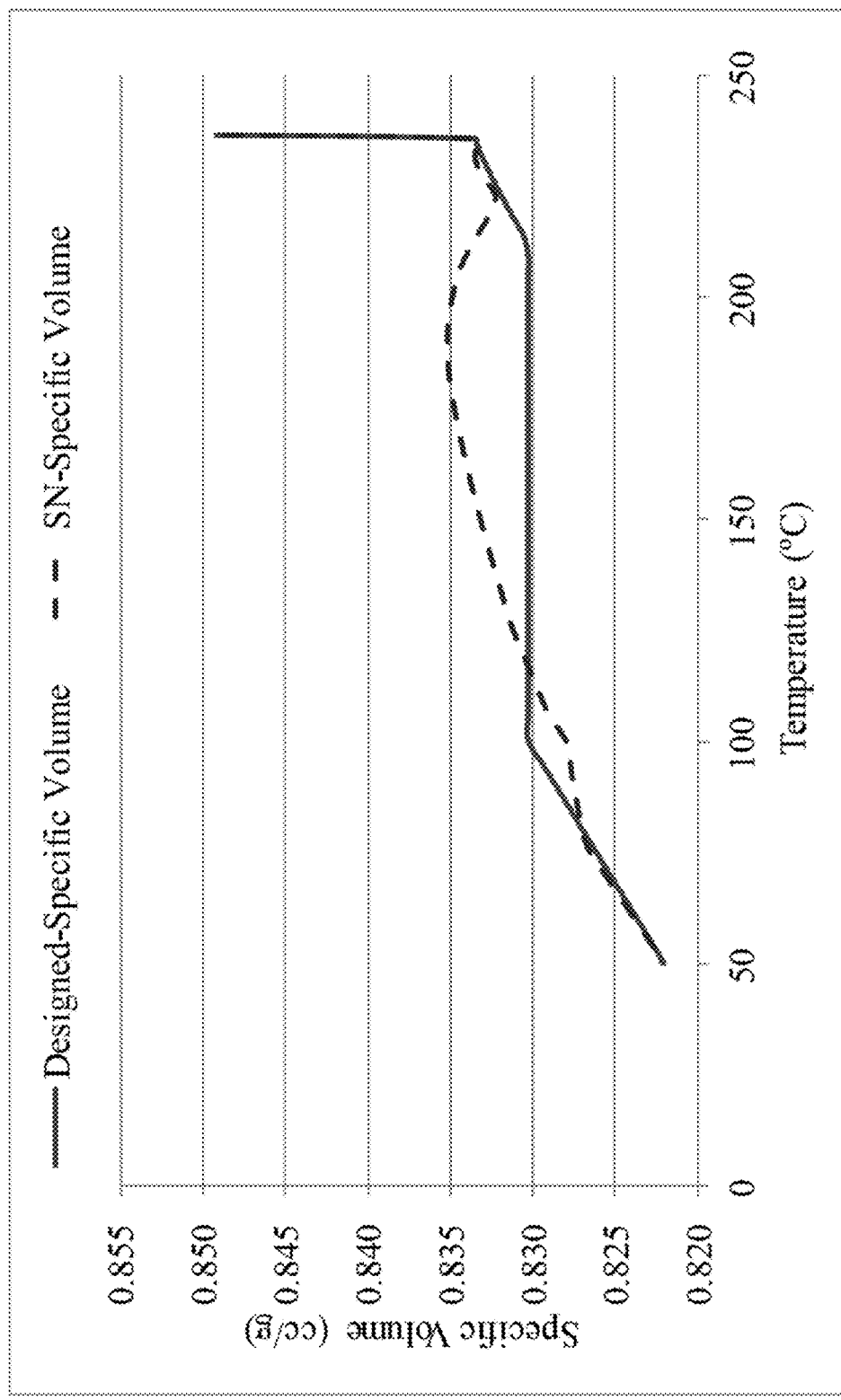
FIG. 18 is a schematic plot showing the comparison of the simulated state waveform and the designed state waveform in terms of a variation of the in-mold specific volume (SN-specific volume) at the sensing node with respect to the in-mold temperature in accordance with some embodiments of the present disclosure.

FIG. 17 is a schematic plot showing the comparison of the simulated state waveform and the designed state waveform in terms of a variation of the in-mold pressure (SN-pressure) at the sensing node 73 with respect to the in-mold temperature, and FIG. 18 is a schematic plot showing the comparison of the simulated state waveform and the designed state waveform in terms of a variation of the in-mold specific volume (SN-specific volume) at the sensing node 73 with respect to the in-mold temperature. Obviously, the simulated state waveform still deviates from the designed state waveform; in other words, the packing pressure profile needs further adjustment.

Figure 19:
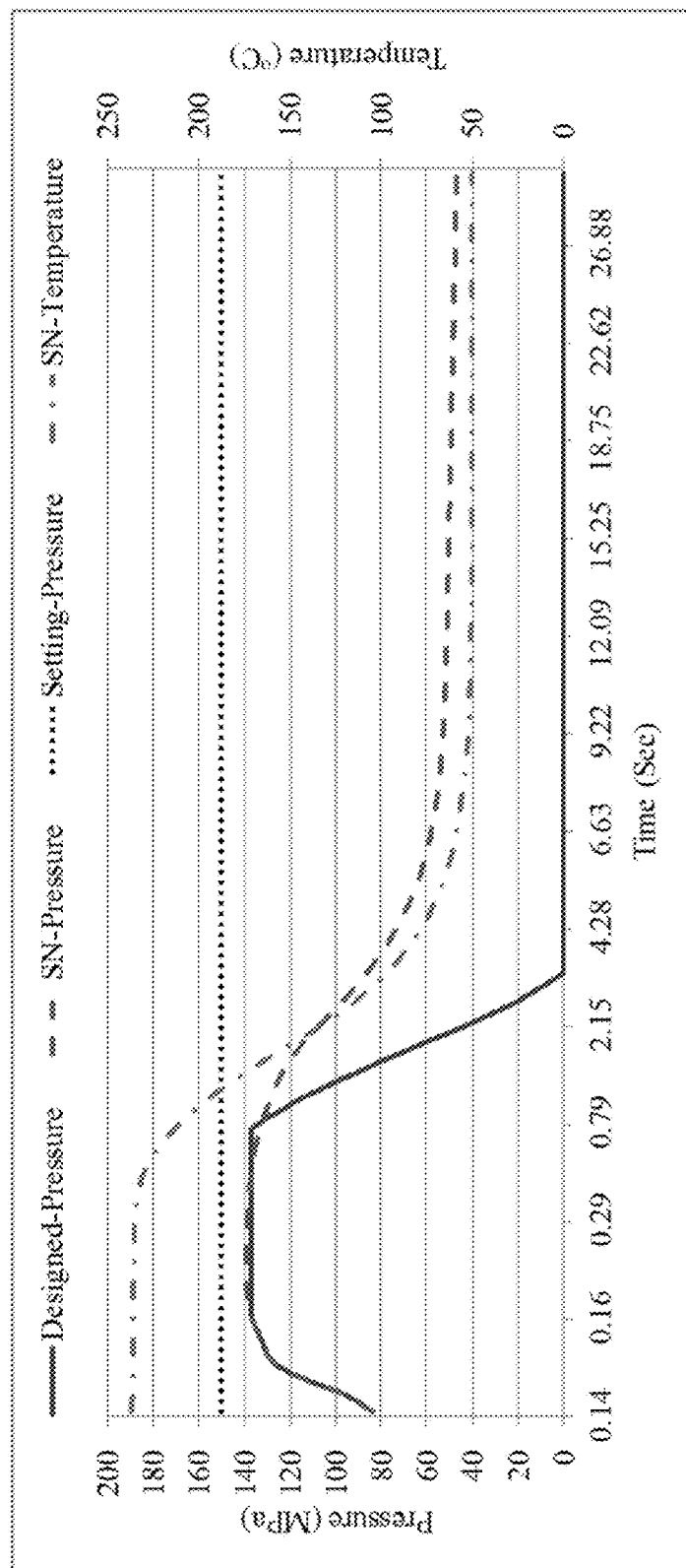
FIG. 19 is a schematic plot showing the comparison of the simulated state waveform and the designed state waveform in terms of a variation of the in-mold pressure (SN-pressure) at the sensing node with respect to the molding time in accordance with some embodiments of the present disclosure.
Figure 20:
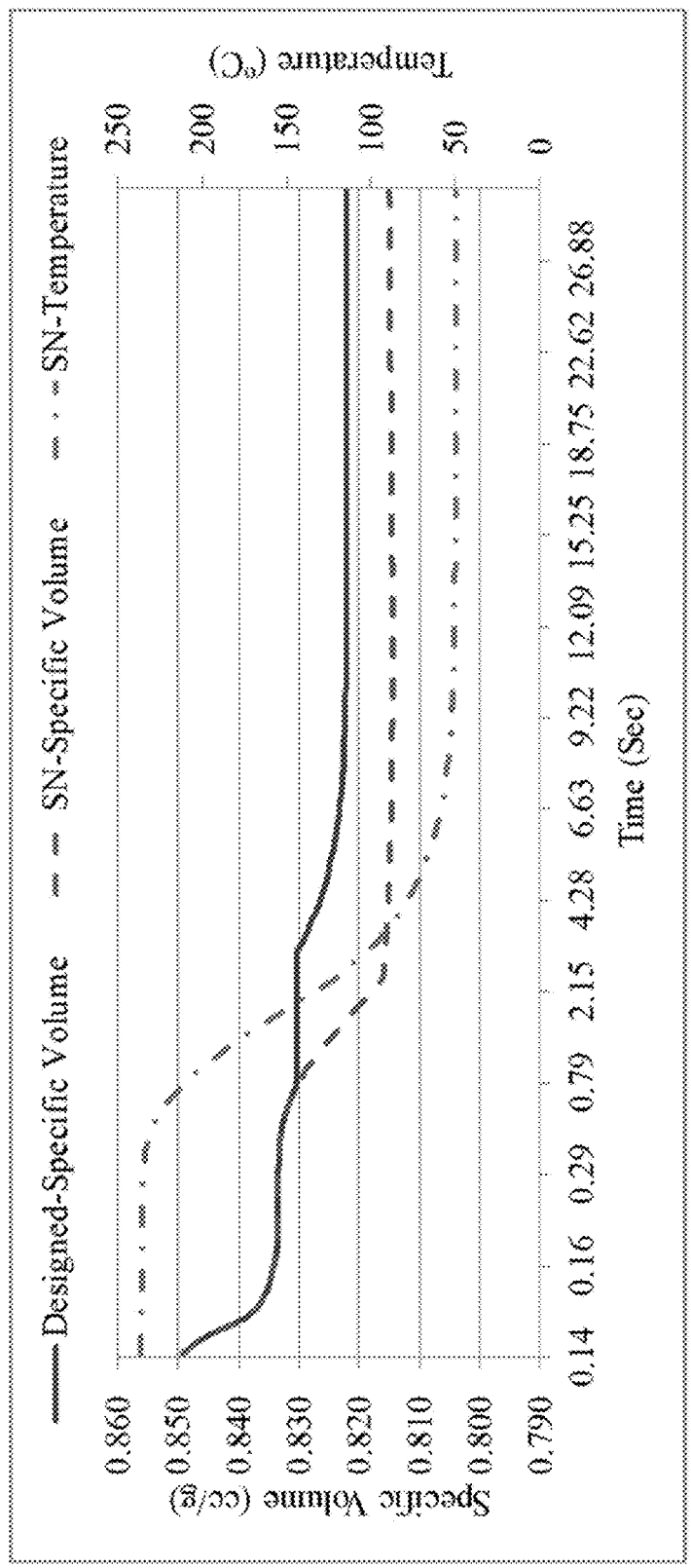
FIG. 20 is a schematic plot showing the comparison of the simulated state waveform and the designed state waveform in terms of a variation of the in-mold specific volume (SN-specific volume) at the sensing node with respect to the molding time in accordance with some embodiments of the present disclosure.

FIG. 19 is a schematic plot showing the comparison of the simulated state waveform and the designed state waveform in terms of a variation of the in-mold pressure (SN-pressure) at the sensing node 73 with respect to the molding time, and FIG. 20 is a plot showing the comparison of the simulated state waveform and the designed state waveform in terms of a variation of the in-mold specific volume (SN-specific volume) at the sensing node 73 with respect to the molding time. Obviously, the simulated state waveform still deviates from the designed state waveform; in other words, the packing pressure profile needs further adjustment.

Figure 21:
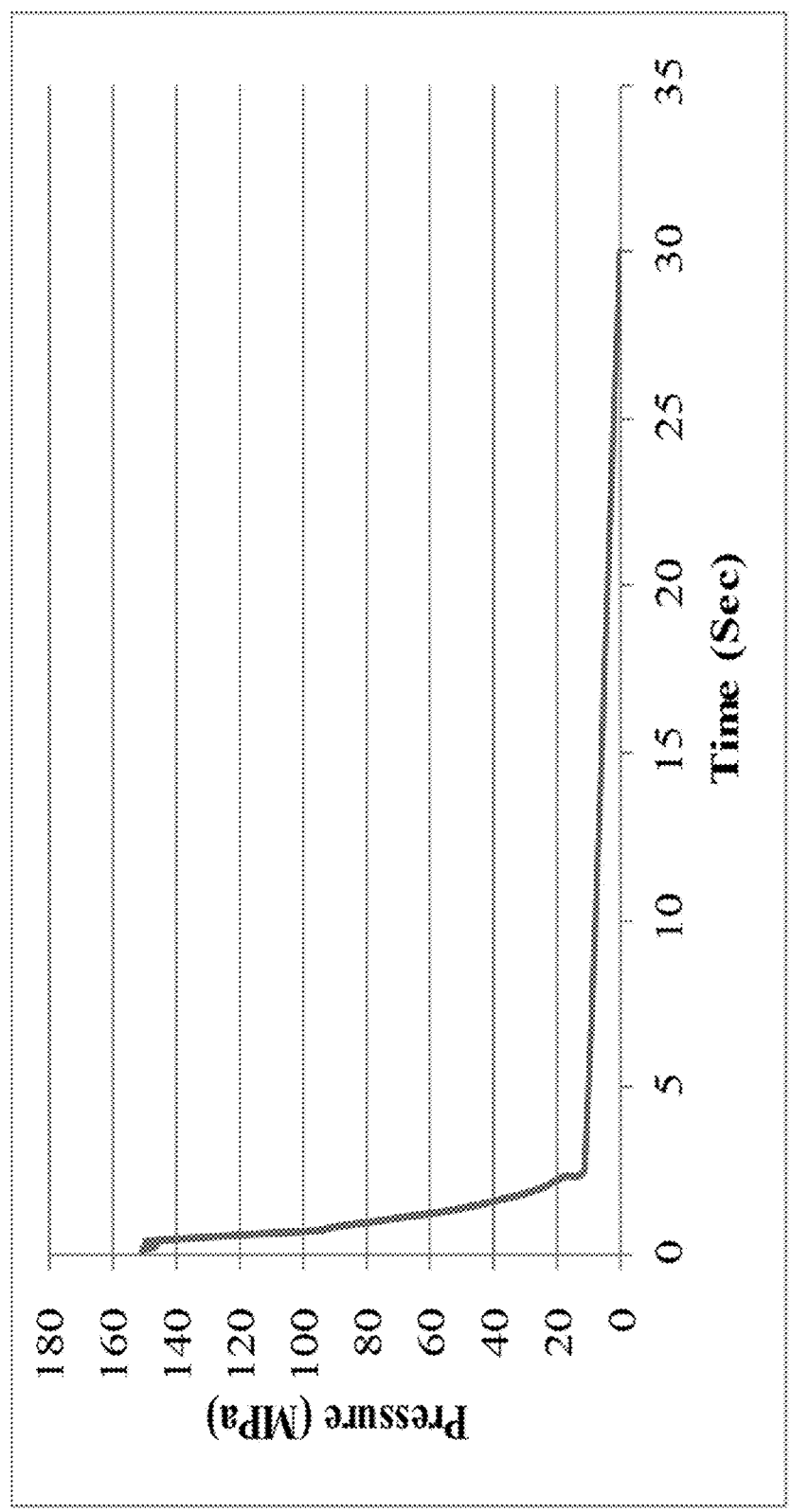
FIG. 21 is a schematic plot showing an updated packing pressure waveform to be applied to at least a portion of the genuine domain in accordance with some embodiments of the present disclosure.

FIG. 21 is a schematic plot showing an updated packing pressure waveform to be applied to at least a portion (nozzle 29) of the genuine domain 60 in accordance with some embodiments of the present disclosure. Referring backing FIG. 16, in some embodiments of the present disclosure, the simulated state waveform is divided into three phases: isobaric phase, isochoric phase and post-freezing phase, wherein the isobaric phase and the isochoric phase are separated by a transition node at the transition temperature ($T_T$), while the isochoric phase and the post-freezing phase are separated by a gate-freezing node at the gate-freezing temperature ($T_{GF}$).

In some embodiments of the present disclosure, in the isobaric phase, the pressure ($P_{new}$) of the updated packing pressure waveform is generated by a formula $P_{new}=(Pd/Ps)*P_{old}$, where Pd is the pressure of the designed state waveform in FIG. 16, Ps is the pressure of the simulated state waveform in FIG. 16, and $P_{old}$ is the pressure of the previous packing pressure profile in FIG. 15.

In some embodiments of the present disclosure, in the isochoric phase, the pressure ($P_{new}$) of the updated packing pressure waveform is generated by a formula $P_{new}=(Pd/Ps)*P_{old}*(\Delta T/\Delta P)$, where Pd is the pressure of the designed state waveform in FIG. 16, Ps is the pressure of the simulated state waveform in FIG. 16, $P_{old}$ is the pressure of the previous packing pressure profile in FIG. 15, $\Delta T$ is the temperature difference of the simulated state waveform from the beginning to the end of the isochoric phase, and $\Delta P$ is the pressure difference of the simulated state waveform from the beginning to the end of the isochoric phase.

Figure 22:
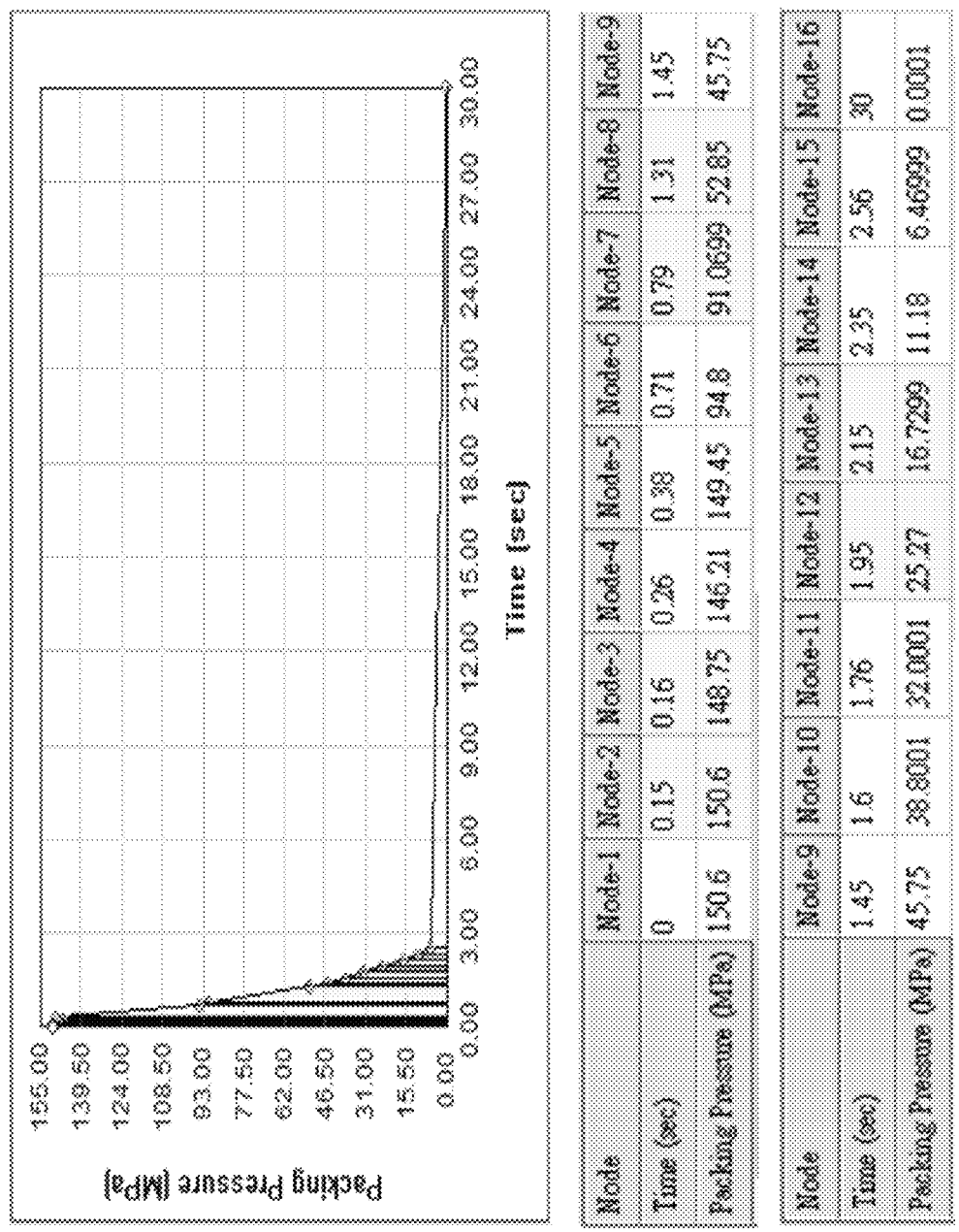
FIG. 22 is a schematic plot showing an updated packing pressure profile to be applied to at least a portion of the genuine domain in accordance with some embodiments of the present disclosure.

FIG. 22 is a schematic plot showing an updated packing pressure profile to be applied to at least a portion (nozzle 29) of the genuine domain 60 in accordance with some embodiments of the present disclosure. Referring backing FIG. 16, the difference of the specific volume variation between the simulated state waveform and the designed state waveform is larger than a predetermined range; in other words, the packing pressure profile needs further adjustment. In some embodiments, the present disclosure solves this drawback by dividing the single-section packing pressure profile in FIG. 15 into a plurality of sections by adding at least one control node, i.e., dividing the previous single section into multiple sections by adding control nodes (the newly added control nodes 2-15).

In some embodiments of the present disclosure, the updated packing pressure waveform in FIG. 21 is divided into a plurality of sections by adding control nodes based on an user-defined range (for example: 3% of pressure difference between two time steps, and the time step is the one used in the virtual molding for solving the governing equations (1)-(4)). As a result, four (4) control nodes are newly added in the isobaric phase and nine (9) control nodes are newly added in the isochoric phase. In some embodiments of the present disclosure, the gate-freezing time is determined by checking if the temperature of the simulated state waveform is lower than a freezing temperature (119.85° C.) of the molding resin (ABS), which is a temperature slightly lower than a glass-transition temperature of the molding resin 16. In some embodiments of the present disclosure, the gate-freezing time is about 2.56 second, which is a newly added control node (Node-15).

Figure 23:
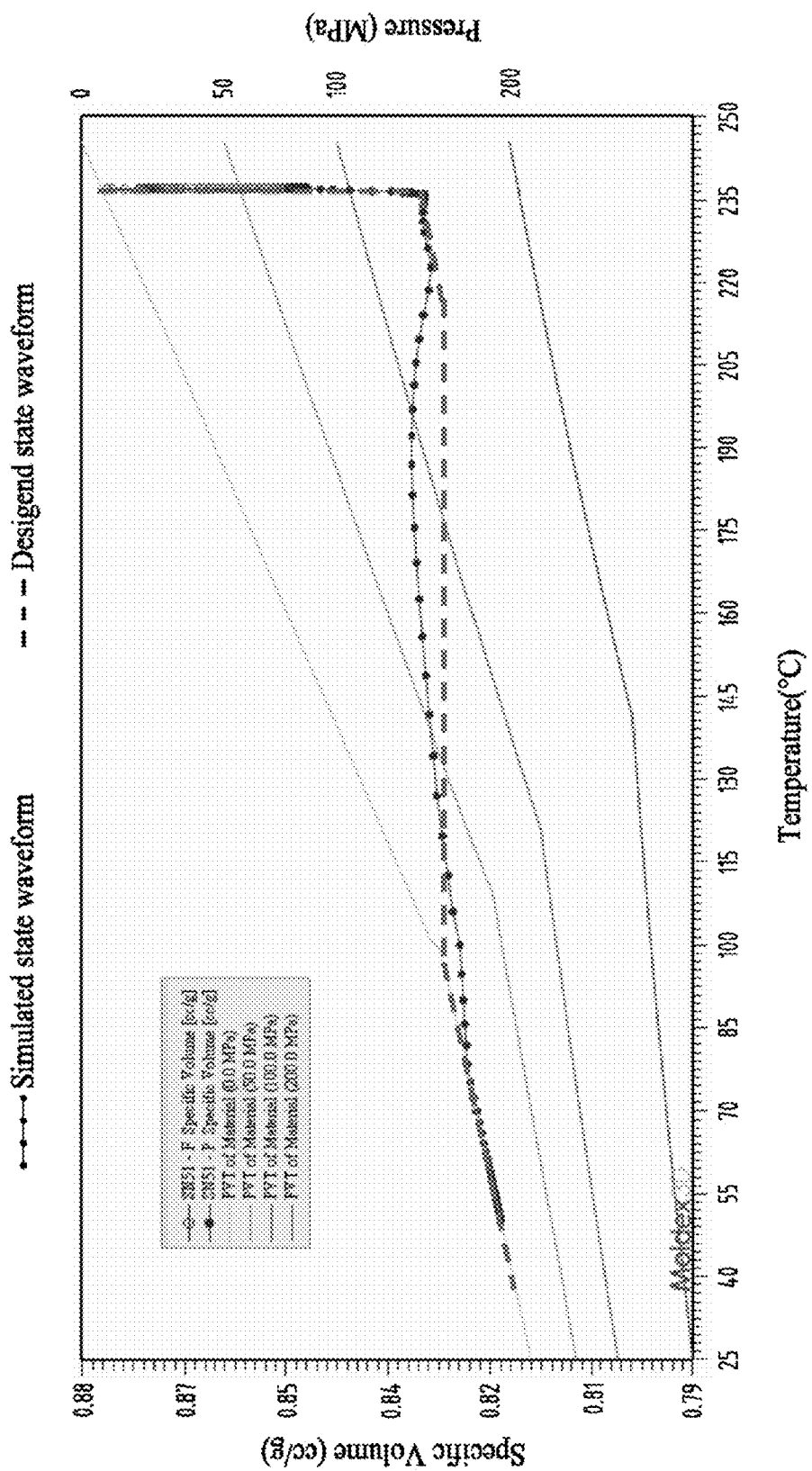
FIG. 23 is a schematic plot showing a simulated state waveform of a portion of the simulating domain from the virtual molding using the packing pressure profile in FIG. 22 in accordance with some embodiments of the present disclosure.

The following describes the repeating of the virtual molding while taking into consideration the updated packing pressure profile to generate an updated state waveform of the molding resin. FIG. 23 is a schematic plot showing a simulated state waveform of a portion (sensing node 73) of the simulating domain 70 from the virtual molding using the packing pressure profile in FIG. 22 in accordance with some embodiments of the present disclosure, wherein the designed state waveform is also shown in FIG. 23 for comparison with the simulated state waveform. Obviously, the difference of the specific volume variation between the simulated state waveform and the designed state waveform is larger than a predetermined range (for example, 0.2%); in other words, the packing pressure profile needs further adjustment.

Figure 24:
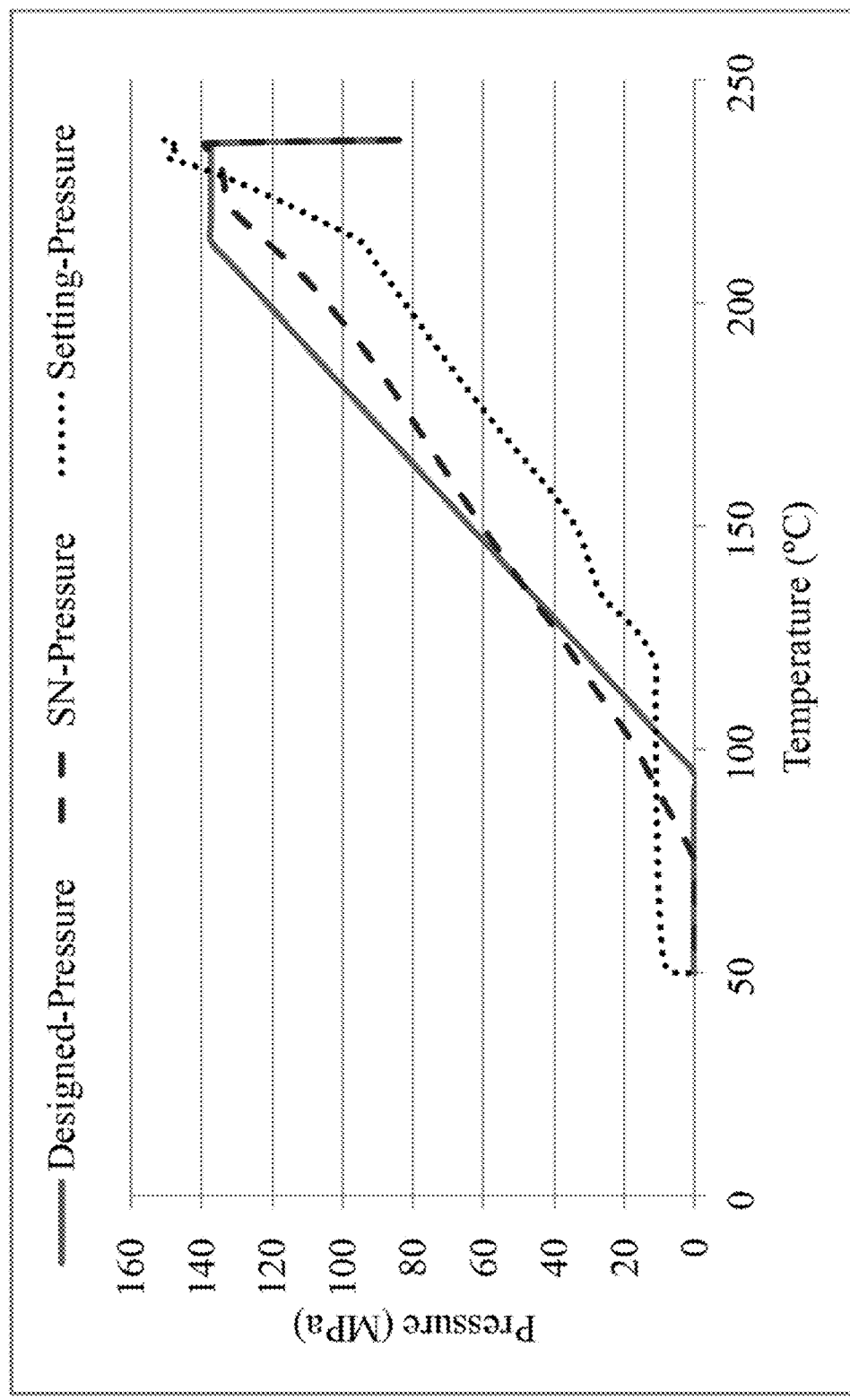
FIG. 24 is a schematic plot showing the comparison of the simulated state waveform and the designed state waveform in terms of a variation of the in-mold pressure (SN-pressure) at the sensing node with respect to the in-mold temperature in accordance with some embodiments of the present disclosure.
Figure 25:
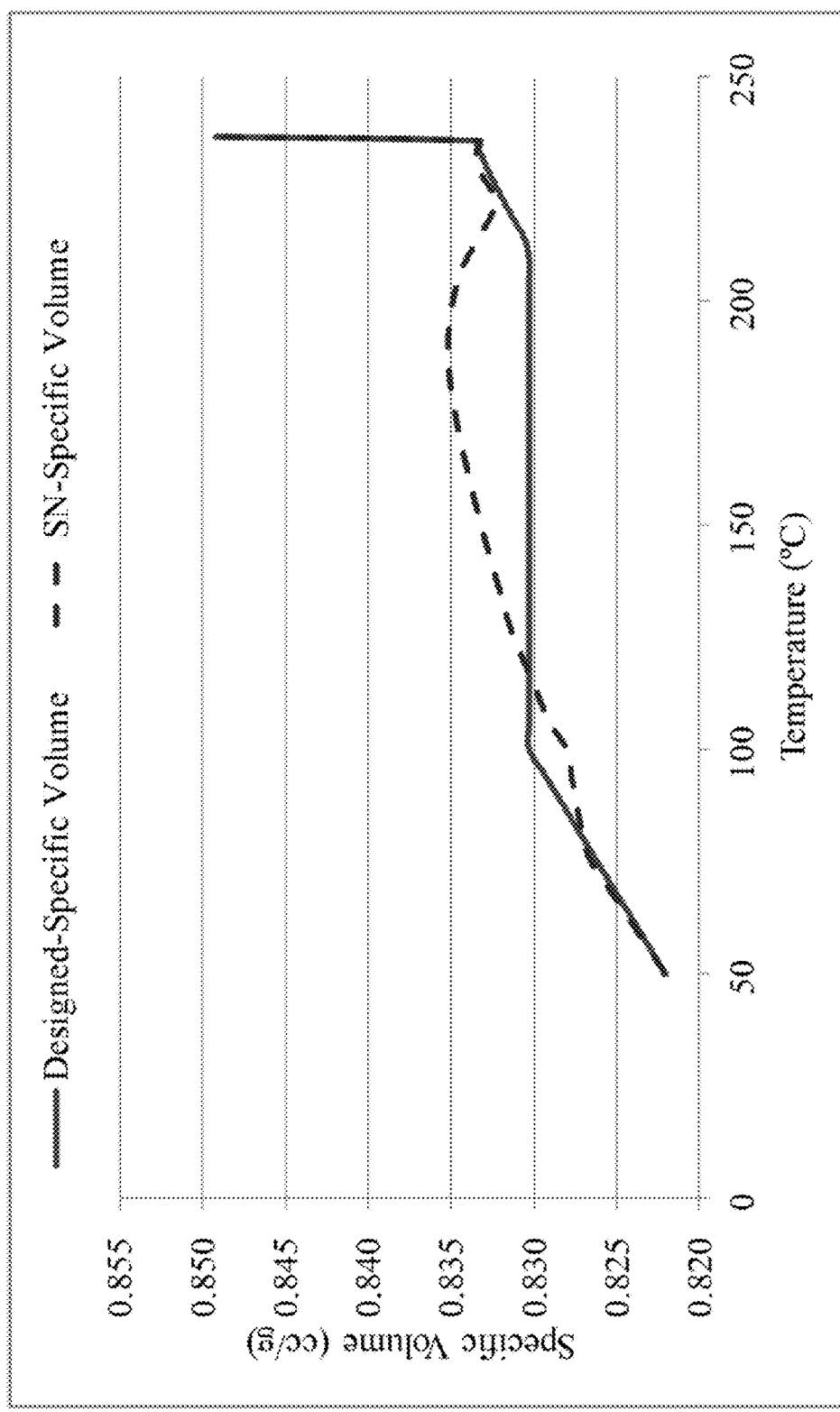
FIG. 25 is a schematic plot showing the comparison of the simulated state waveform and the designed state waveform in terms of a variation of the in-mold specific volume (SN-specific volume) at the sensing node with respect to the in-mold temperature in accordance with some embodiments of the present disclosure.

FIG. 24 is a schematic plot showing the comparison of the simulated state waveform and the designed state waveform in terms of a variation of the in-mold pressure (SN-pressure) at the sensing node 73 with respect to the in-mold temperature, and FIG. 25 is a schematic plot showing the comparison of the simulated state waveform and the designed state waveform in terms of a variation of the in-mold specific volume (SN-specific volume) at the sensing node 73 with respect to the in-mold temperature. Obviously, the simulated state waveform still deviates from the designed state waveform; in other words, the packing pressure profile needs further adjustment.

Figure 26:
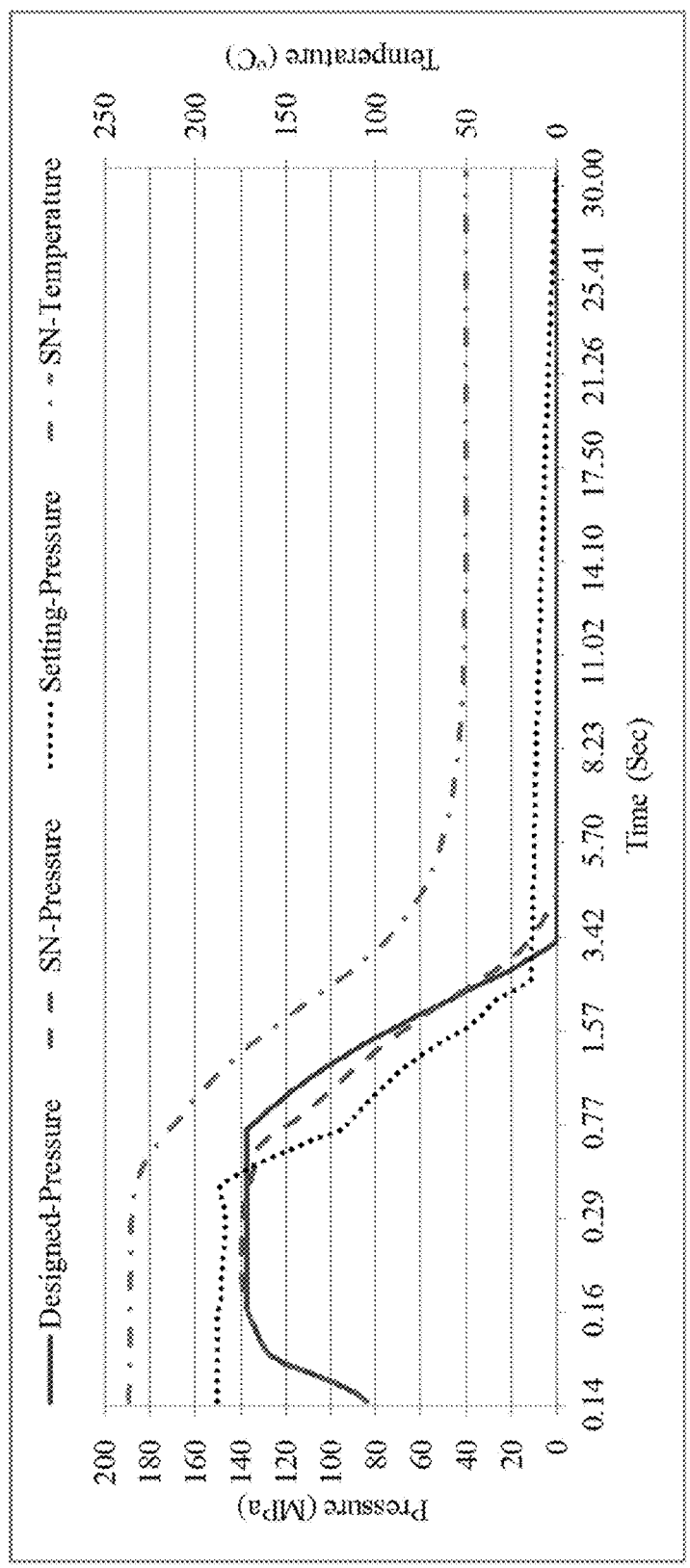
FIG. 26 is a schematic plot showing the comparison of the simulated state waveform and the designed state waveform in terms of a variation of the in-mold pressure (SN-pressure) at the sensing node with respect to the molding time in accordance with some embodiments of the present disclosure.
Figure 27:
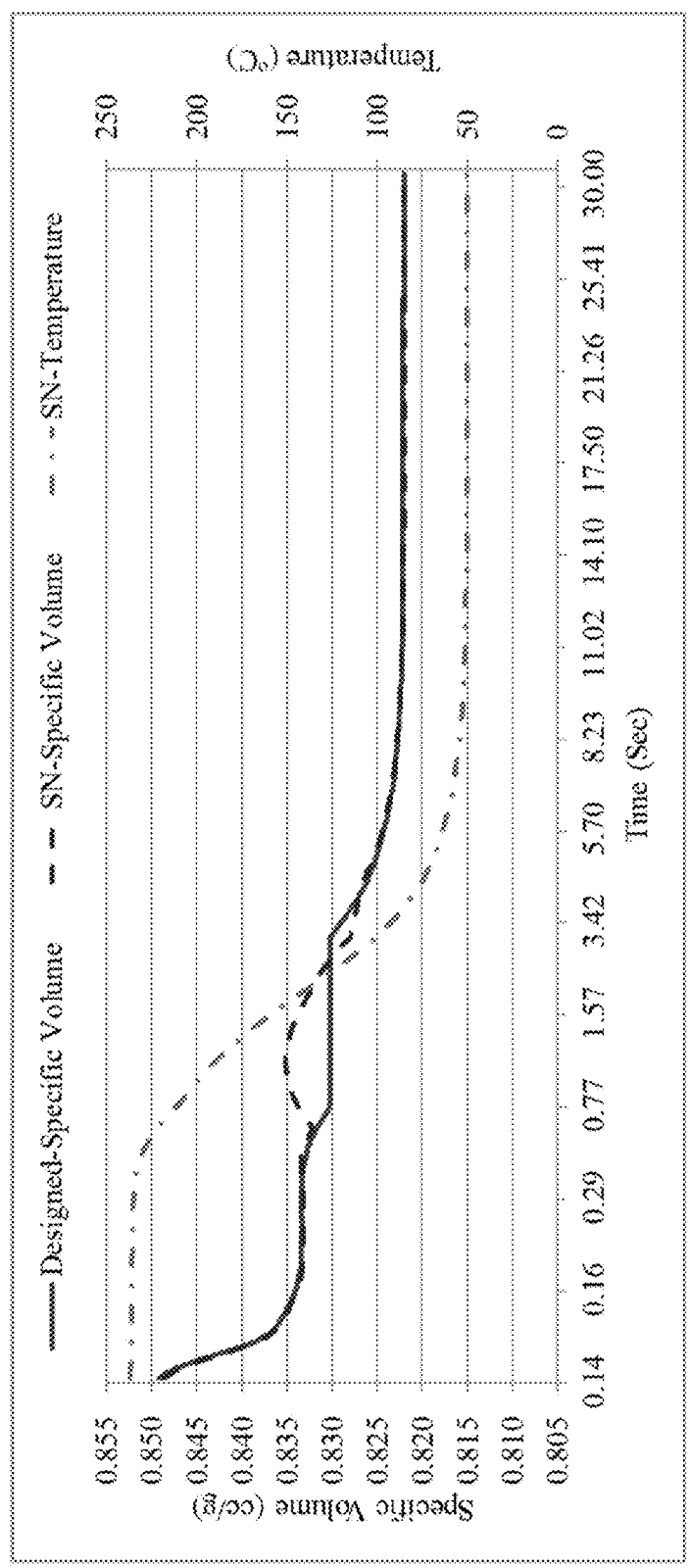
FIG. 27 is a schematic plot showing the comparison of the simulated state waveform and the designed state waveform in terms of a variation of the in-mold specific volume (SN-specific volume) at the sensing node with respect to the molding time in accordance with some embodiments of the present disclosure.

FIG. 26 is a schematic plot showing the comparison of the simulated state waveform and the designed state waveform in terms of a variation of the in-mold pressure (SN-pressure) at the sensing node 73 with respect to the molding time, and FIG. 27 is a schematic plot showing the comparison of the simulated state waveform and the designed state waveform in terms of a variation of the in-mold specific volume (SN-specific volume) at the sensing node 73 with respect to the molding time. Obviously, the simulated state waveform still deviates from the designed state waveform; in other words, the packing pressure profile needs further adjustment.

Figure 28:
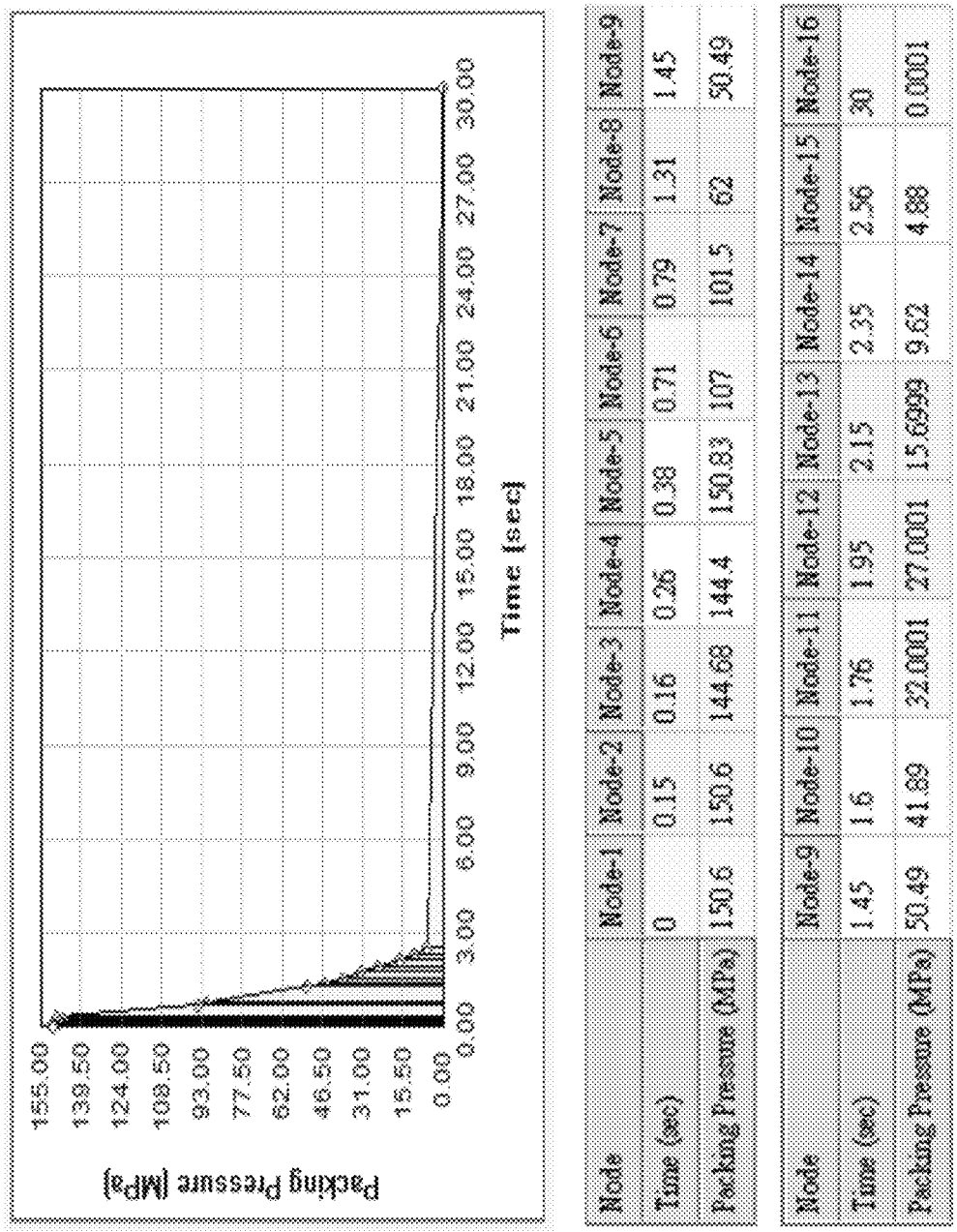
FIG. 28 is a schematic plot showing an updated packing pressure profile to be applied to at least a portion of the genuine domain in accordance with some embodiments of the present disclosure.

FIG. 28 is a schematic plot showing an updated packing pressure profile to be applied to at least a portion (nozzle 29) of the genuine domain 60 in accordance with some embodiments of the present disclosure. In some embodiments, before 0.15 seconds, the difference of the specific volume variation between the simulated state waveform and the designed state waveform is within the predetermined range, and the packing pressure is not adjusted. In contrast, the difference of the specific volume variation between the simulated state waveform and the designed state waveform is within the predetermined range, and the packing pressure of the node 3 to the node 16 are adjusted; for example, by using the formula described in FIG. 21 and FIG. 22.

Figure 29:
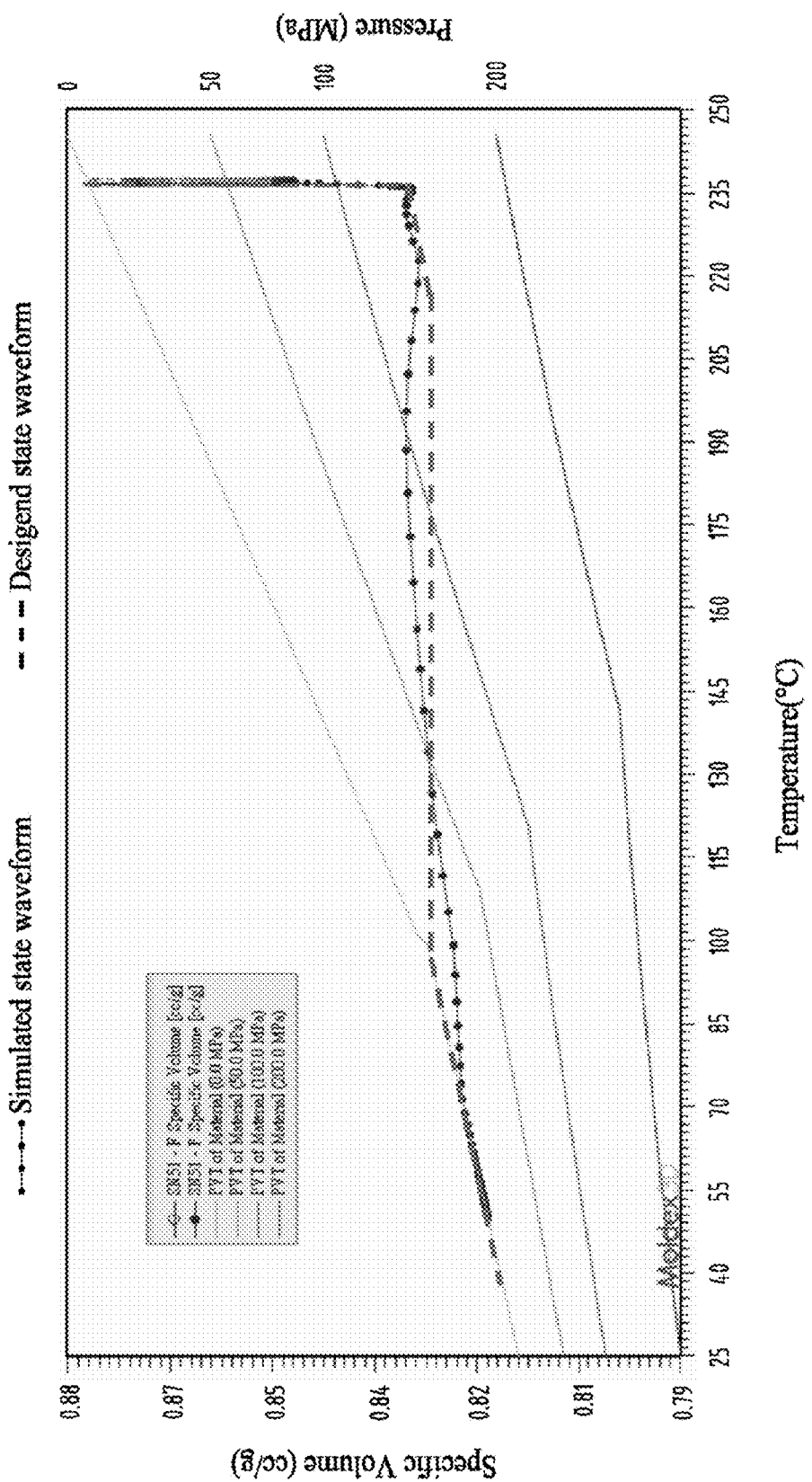
FIG. 29 is a schematic plot showing a simulated state waveform of a portion of the simulating domain from the virtual molding using the packing pressure profile in FIG. 28 in accordance with some embodiments of the present disclosure.

FIG. 29 is a schematic plot showing a simulated state waveform of a portion (sensing node 73) of the simulating domain 70 from the virtual molding using the packing pressure profile in FIG. 28 in accordance with some embodiments of the present disclosure, wherein the designed state waveform is also shown in FIG. 29 for comparison with the simulated state waveform. Obviously, the difference of the specific volume variation between the simulated state waveform and the designed state waveform is larger than a predetermined range; in other words, the packing pressure profile needs further adjustment.

Figure 30:
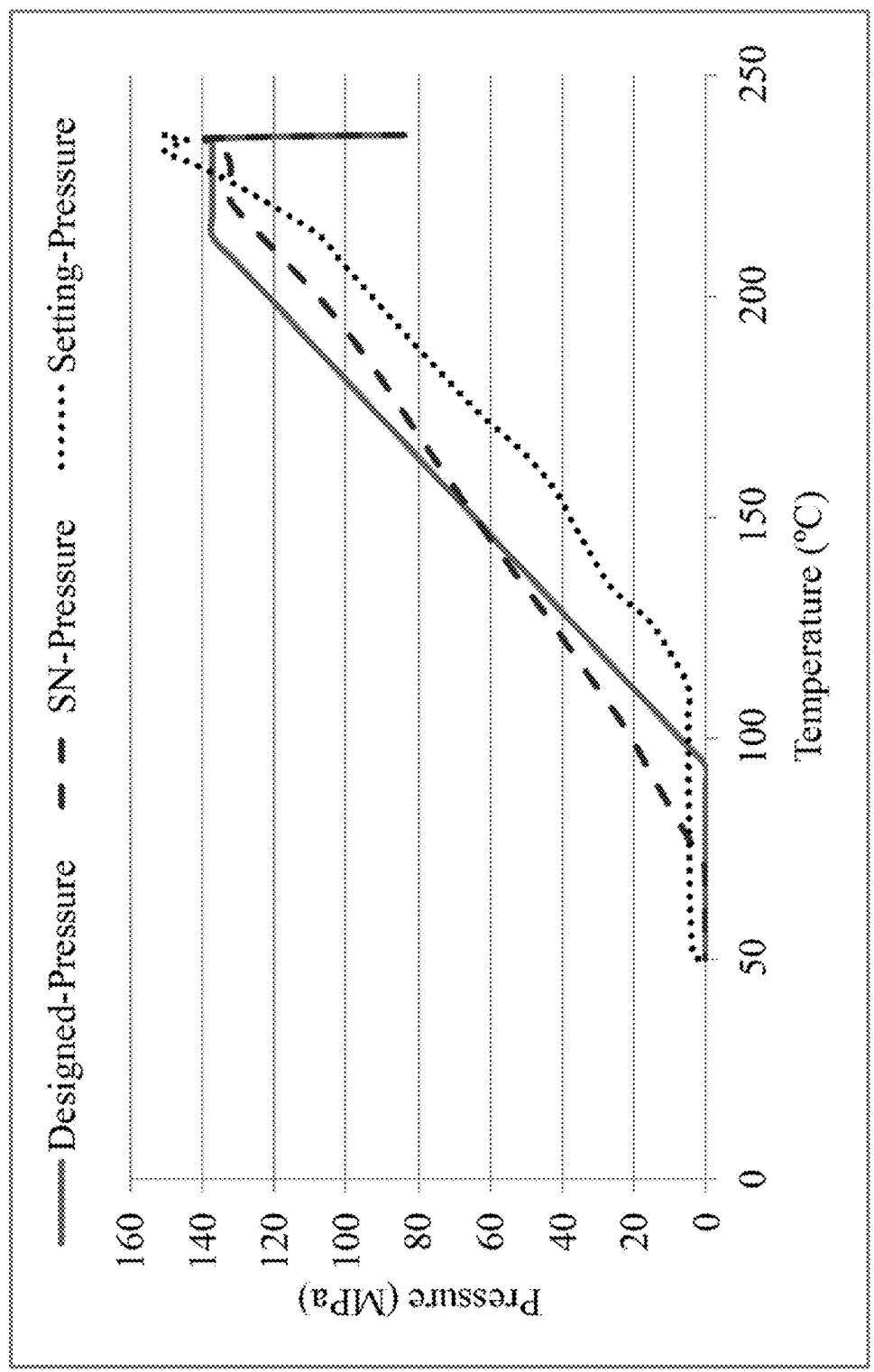
FIG. 30 is a schematic plot showing the comparison of the simulated state waveform and the designed state waveform in terms of a variation of the in-mold pressure (SN-pressure) at the sensing node with respect to the in-mold temperature in accordance with some embodiments of the present disclosure.
Figure 31:
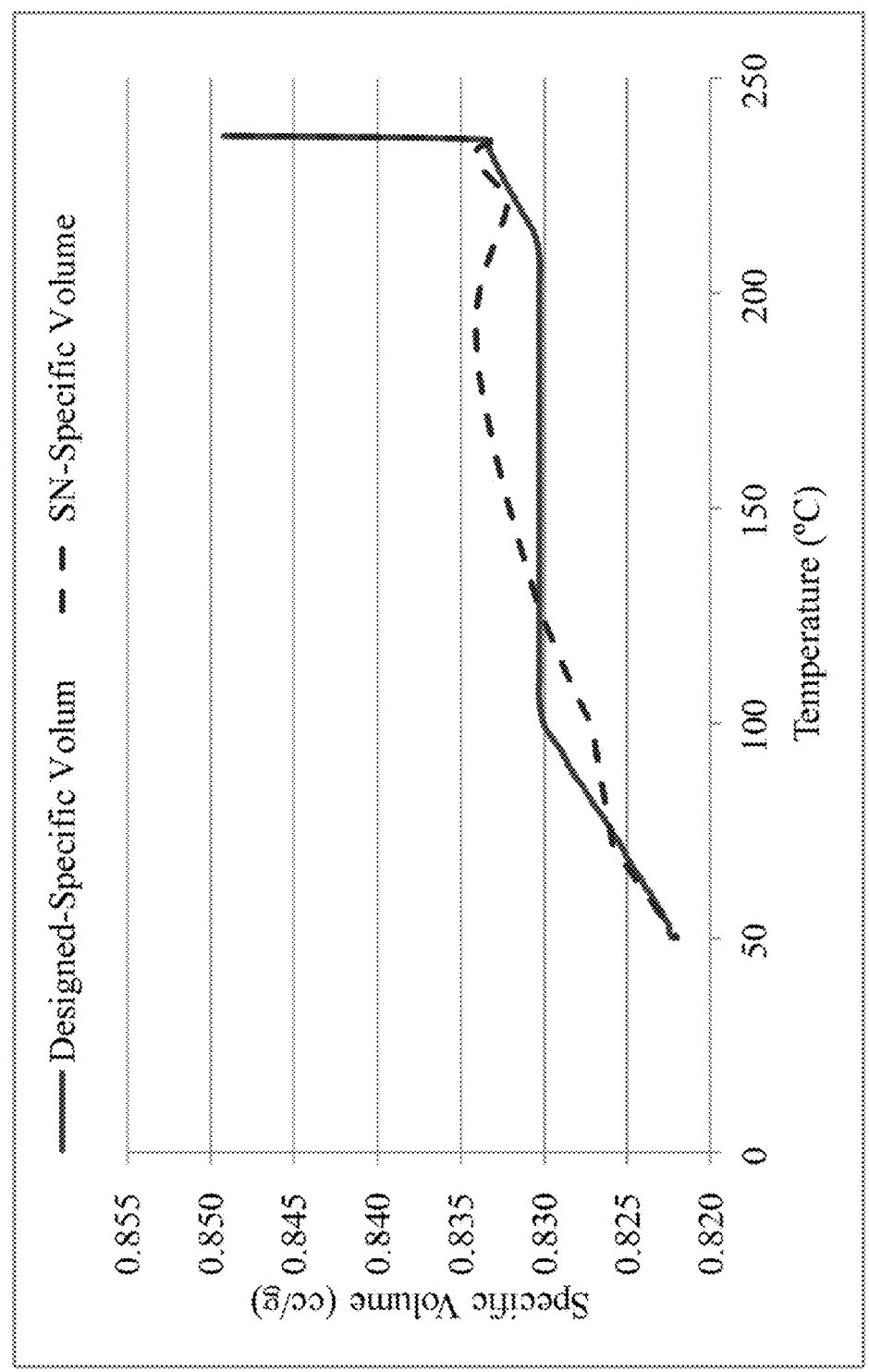
FIG. 31 is a schematic plot showing the comparison of the simulated state waveform and the designed state waveform in terms of a variation of the in-mold specific volume (SN-specific volume) at the sensing node with respect to the in-mold temperature in accordance with some embodiments of the present disclosure.

FIG. 30 is a schematic plot showing the comparison of the simulated state waveform and the designed state waveform in terms of a variation of the in-mold pressure (SN-pressure) at the sensing node 73 with respect to the in-mold temperature, and FIG. 31 is a schematic plot showing the comparison of the simulated state waveform and the designed state waveform in terms of a variation of the in-mold specific volume (SN-specific volume) at the sensing node 73 with respect to the in-mold temperature. Obviously, the simulated state waveform still deviates from the designed state waveform; in other words, the packing pressure profile needs further adjustment.

Figure 32:
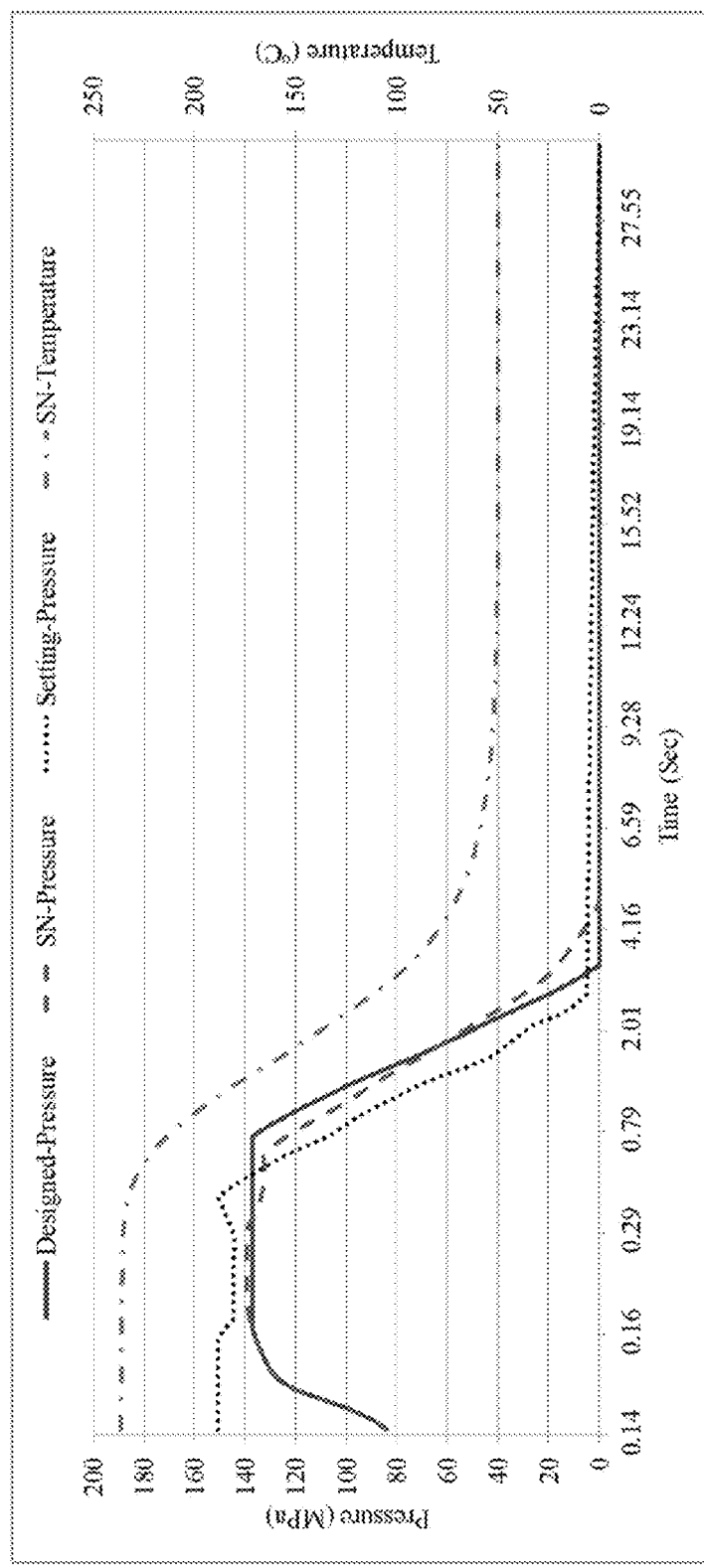
FIG. 32 is a schematic plot showing the comparison of the simulated state waveform and the designed state waveform in terms of a variation of the in-mold pressure (SN-pressure) at the sensing node with respect to the molding time in accordance with some embodiments of the present disclosure.
Figure 33:
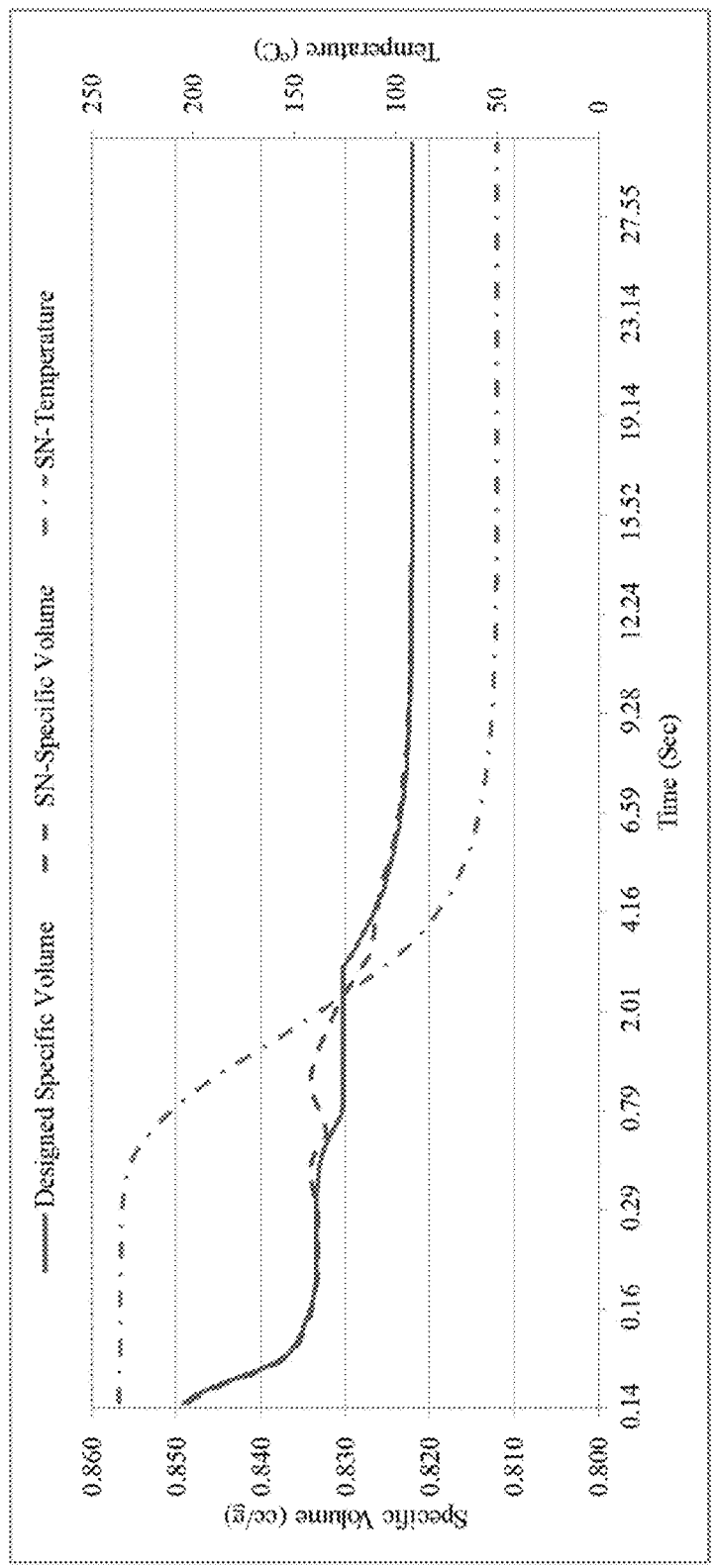
FIG. 33 is a schematic plot showing the comparison of the simulated state waveform and the designed state waveform in terms of a variation of the in-mold specific volume (SN-specific volume) at the sensing node with respect to the molding time in accordance with some embodiments of the present disclosure.

FIG. 32 is a schematic plot showing the comparison of the simulated state waveform and the designed state waveform in terms of a variation of the in-mold pressure (SN-pressure) at the sensing node 73 with respect to the molding time, and FIG. 33 is a schematic plot showing the comparison of the simulated state waveform and the designed state waveform in terms of a variation of the in-mold specific volume (SN-specific volume) at the sensing node 73 with respect to the molding time. Obviously, the simulated state waveform still deviates from the designed state waveform; in other words, the packing pressure profile needs further adjustment.

Figure 34:
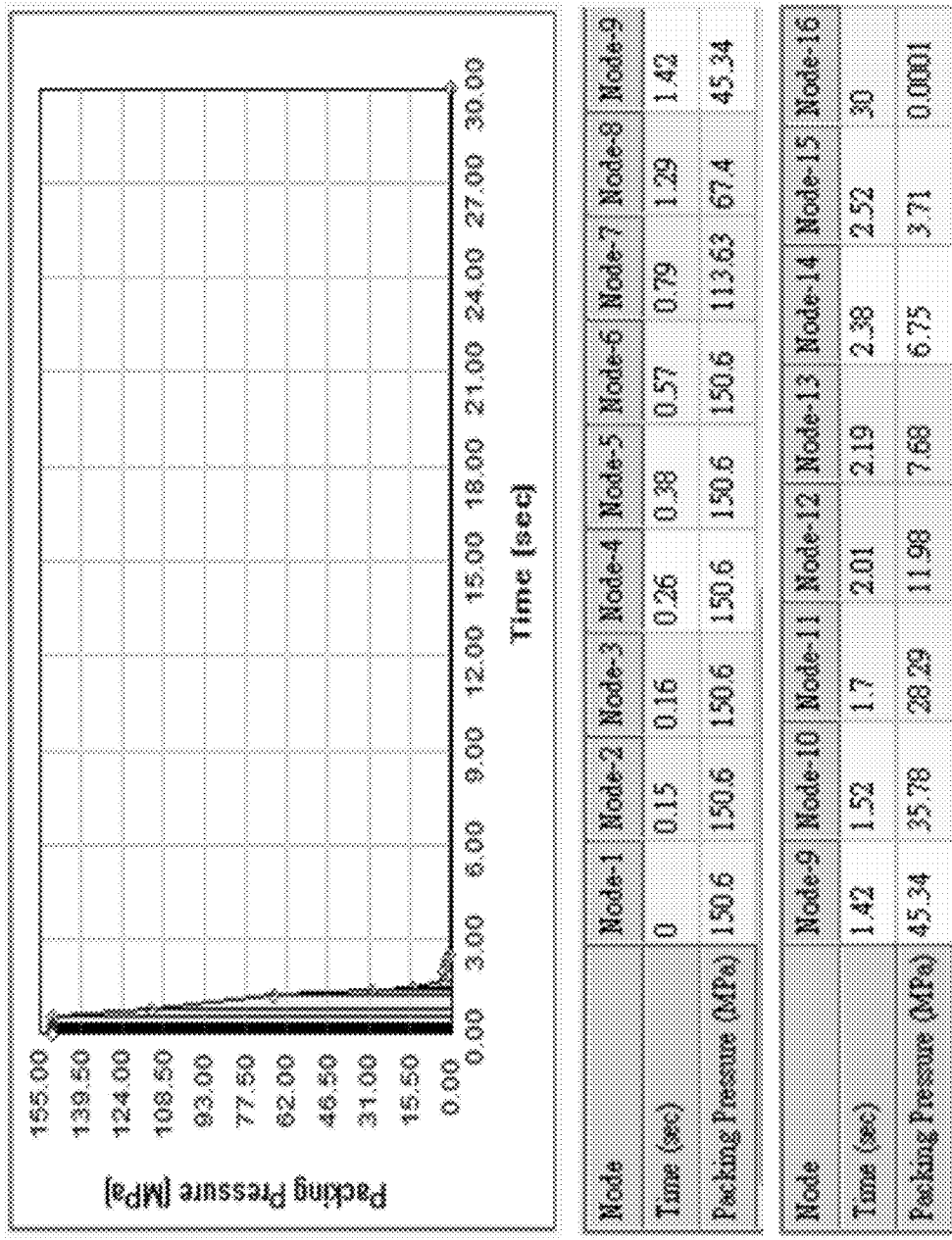
FIG. 34 is a schematic plot showing an updated packing pressure profile to be applied to at least a portion of the genuine domain in accordance with some embodiments of the present disclosure.

FIG. 34 is a schematic plot showing an updated packing pressure profile to be applied to at least a portion (nozzle 29) of the genuine domain 60 in accordance with some embodiments of the present disclosure. Referring backing FIG. 29, the difference of the specific volume variation between the simulated state waveform and the designed state waveform is larger than a predetermined range; in other words, the packing pressure profile needs further adjustment. In some embodiments, before 0.15 seconds, the difference of the specific volume variation between the simulated state waveform and the designed state waveform is within the predetermined range, and the packing pressure is not adjusted. In contrast, the difference of the specific volume variation between the simulated state waveform and the designed state waveform is within the predetermined range, and the packing pressure of the node 3 to the node 16 are adjusted; for example, by using the formula described in FIG. 21 and FIG. 22.

Figure 35:
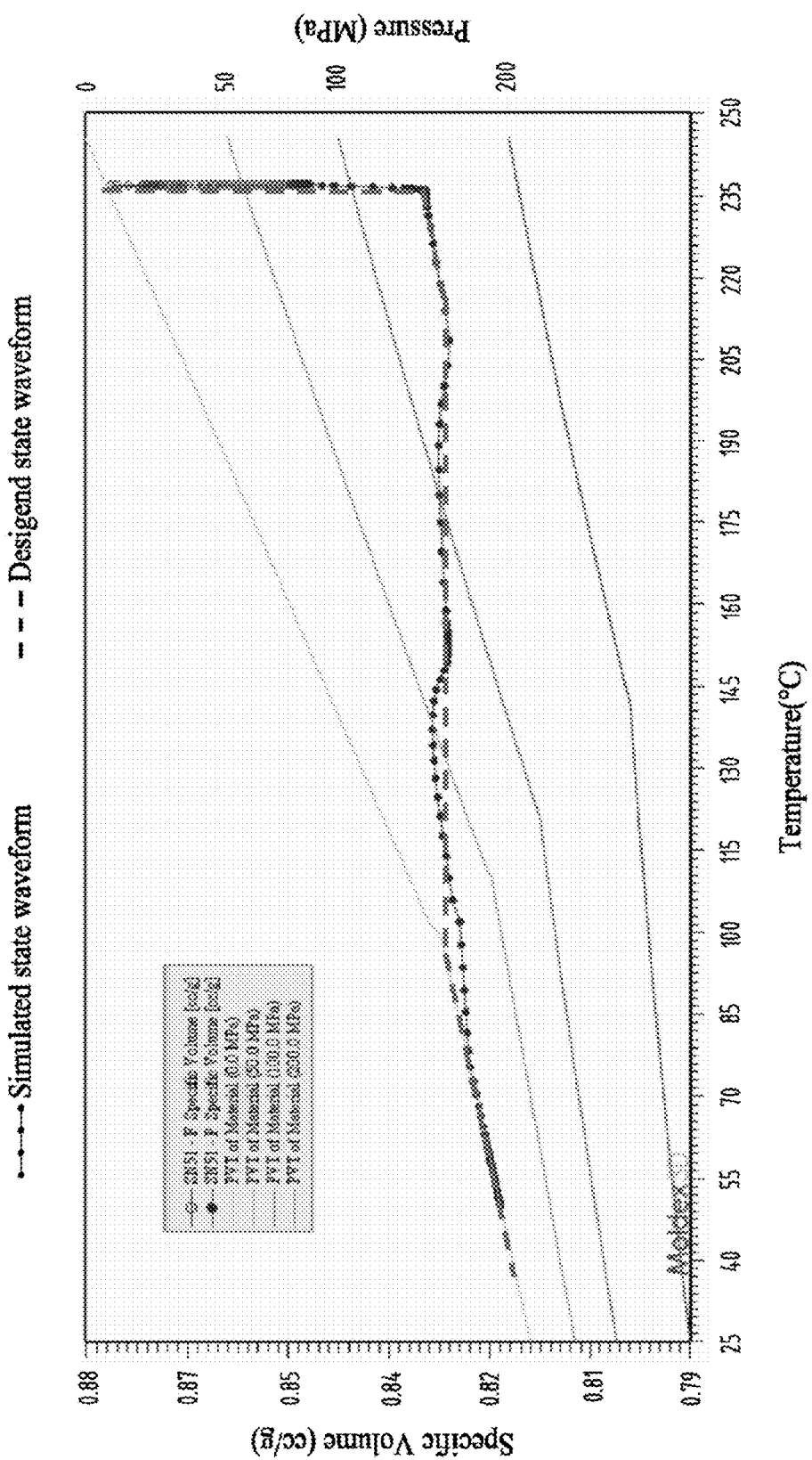
FIG. 35 is a schematic plot showing a simulated state waveform of a portion (sensing node) of the simulating domain from the virtual molding using the packing pressure profile in FIG. 34 in accordance with some embodiments of the present disclosure.

FIG. 35 is a schematic plot showing a simulated state waveform of a portion (sensing node 73) of the simulating domain 70 from the virtual molding using the packing pressure profile in FIG. 34 in accordance with some embodiments of the present disclosure, wherein the designed state waveform is also shown in FIG. 35 for comparison with the simulated state waveform. The difference of the specific volume variation between the simulated state waveform and the designed state waveform is within a predetermined range; in other words, the packing pressure profile can be implemented by the screw 15 of the molding machine 10 to generate the simulated state waveform, which is substantially the same as the designed state waveform to manufacture the molding product with the designed size (volume) and shape. In other words, the shrinkage problem of the molding product can be effectively solved, and the molding product can be manufactured precisely and accurately.

Referring back to FIG. 4, in the step 39, the molding condition of the molding machine 10 is set while taking into consideration the updated packing pressure profile in FIG. 34 to perform an actual molding by applying an actual molding pressure to the at least a portion of the genuine domain to prepare the molding product. In some embodiments of the present disclosure, the molding condition (e.g., the operation condition of the screw-driving motor 12) of the molding machine 10 is set to implement the packing pressure profile shown in FIG. 34 to the nozzle 29 of the genuine domain 60 so as to implement the designed state waveform shown in FIG. 35 to the gate portion 25 of the genuine domain 60. In some embodiments of the present disclosure, the present disclosure may implement the packing pressure profile shown in FIG. 34 to the nozzle 29 of the genuine domain 60 while taking into consideration the dynamic movement of the screw 15 in the barrel 11, a volume variation of the molding material 16 in the barrel 11, or the combination thereof, as disclosed in U.S. Pat. No. 8,868,389, assigned to the present assignee and the entirety of which is herein incorporated by reference.

Figure 37:
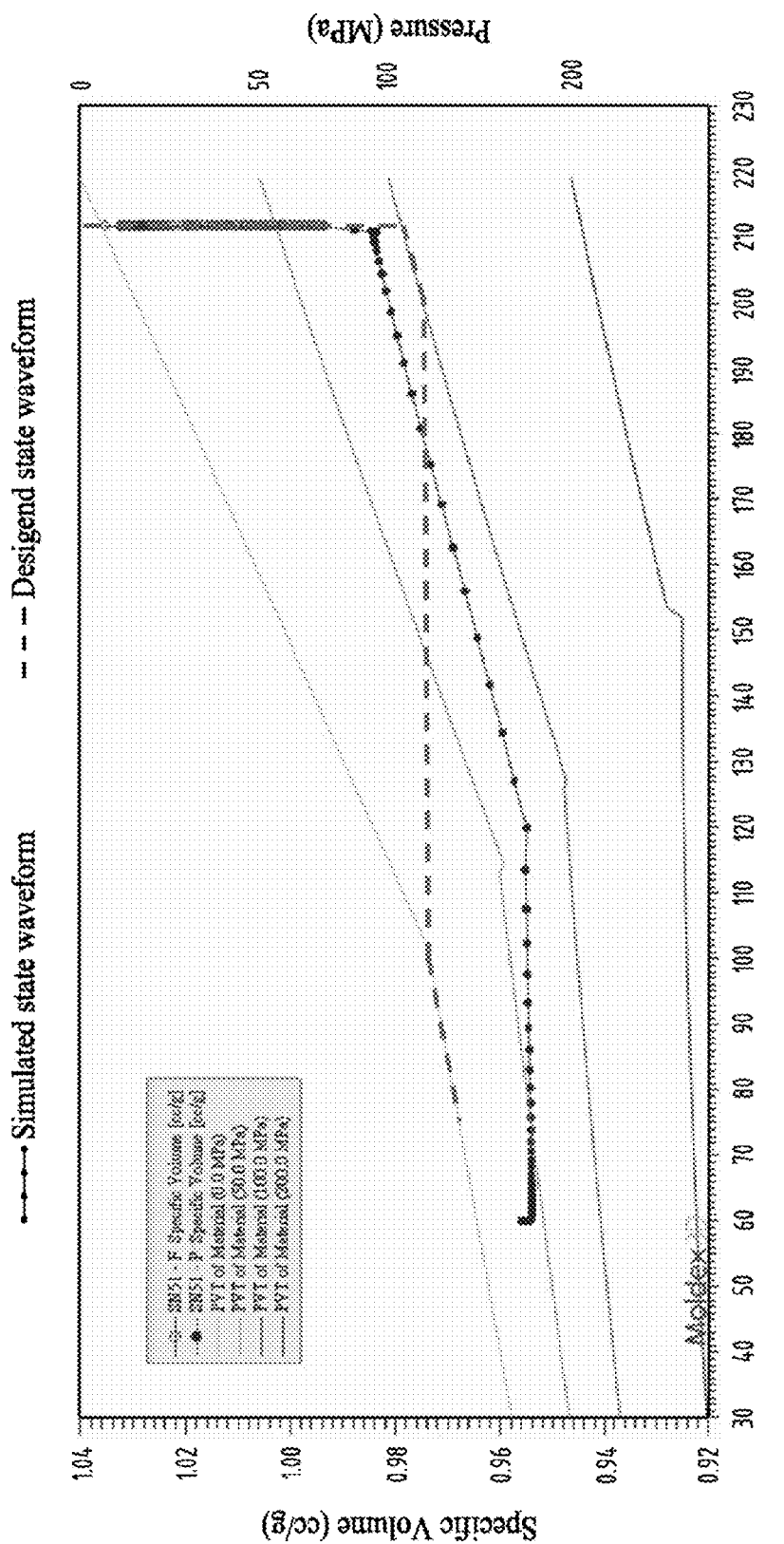
FIG. 37 is a schematic plot showing a simulated state waveform generated from the virtual molding using an initial packing pressure profile as well as the designed state waveform generated from the simulated state waveform in accordance with some embodiments of the present disclosure.

FIG. 36 shows a data sheet of the molding resin (polystyrene, PS) in accordance with some embodiments of the present disclosure, and FIG. 37 is a schematic plot showing a simulated state waveform generated from the virtual molding using an initial packing pressure profile as well as the designed state waveform generated from the simulated state waveform in accordance with some embodiments of the present disclosure. In some embodiments of the present disclosure, the simulated state waveform and the designed state waveform express the relationship among an in-mold pressure and an in-mold temperature and a specific volume of the molding resin at a portion of the simulating domain. Subsequently, the operations described in FIGS. 15-35 can be performed to obtain the updated packing pressure profile, and the molding machine 10 can be set to perform an actual molding to apply a molding pressure by the screw 15 to at least a portion (nozzle 29) of the genuine domain to prepare the molding product while the molding phenomena of the molding resin at the sensing node 73 substantially follows the designed state waveform.

Figure 39:
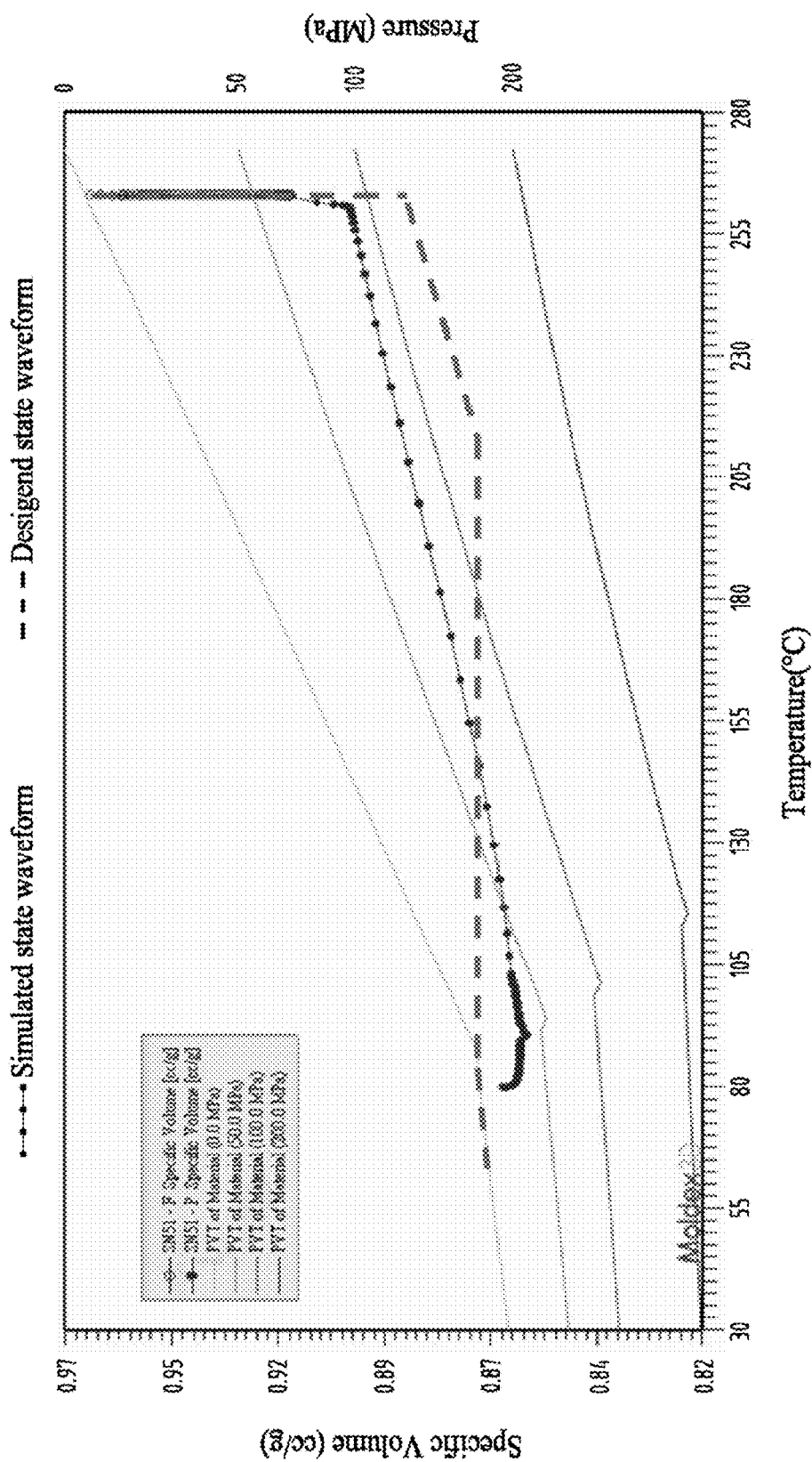
FIG. 39 is a schematic plot showing a simulated state waveform generated from the virtual molding using an initial packing pressure profile as well as the designed state waveform generated from the simulated state waveform in accordance with some embodiments of the present disclosure.

FIG. 38 shows a data sheet of the molding resin (polymethylmethacrylate, PMMA) in accordance with some embodiments of the present disclosure, and FIG. 39 is a schematic plot showing a simulated state waveform generated from the virtual molding using an initial packing pressure profile as well as the designed state waveform generated from the simulated state waveform in accordance with some embodiments of the present disclosure. In some embodiments of the present disclosure, the simulated state waveform and the designed state waveform express the relationship among an in-mold pressure and an in-mold temperature and a specific volume of the molding resin at a portion of the simulating domain. Subsequently, the operations described in FIGS. 15-35 can be performed to obtain the updated packing pressure profile, and the molding machine 10 can be set to perform an actual molding to apply a molding pressure by the screw 15 to at least a portion (nozzle 29) of the genuine domain to prepare the molding product while the molding phenomena of the molding resin at the sensing node 73 substantially follows the designed state waveform.

In some embodiments, the present disclosure uses the computing apparatus 100 to solve the complex governing equations (1)-(4), which describe the molding phenomena occurring within a mold cavity, by the transient state analysis so as generate the designed state waveform expressing a relationship between an in-mold pressure and an in-mold temperature and a specific volume of the molding resin 16. In other words, the present disclosure uses the computing apparatus 100 to perform a virtual molding of the molding resin injected into the mold by the mold machine, and display the progress of the molding process by a state wave form on screen. Consequently, an animated graphical user interface is implemented so that the user can visually observe the progress of the molding process occurring inside the mold without actually opening the mold. In some embodiments, the designed state (PVT) waveform may optionally express the pressure (P), the specification volume (V), and the temperature (T) of the molding resin 16 in a 3-D animated user interface or a 2-D animated user interface. In some embodiments of the present disclosure, the present disclosure then displays an animated user interface on the screen 103 showing the progress of a molding process and the designed state waveform of the molding resin. For example, FIG. 9, FIG. 11, FIG. 14, FIG. 16, FIG. 23, FIG. 29 and FIG. 35 are displayed on the screen 103 showing the variation of the specific volume of the molding resin with respect to the pressure and the temperature during a molding process.

In some embodiments of the present disclosure, a method for operating a molding machine includes steps of specifying a simulating domain corresponding to a genuine domain in a mold disposed on the molding machine, wherein the genuine domain has a mold cavity to be filled with a molding resin from the molding machine to prepare a molding product; performing a virtual molding by using a setting packing pressure profile to generate a simulated state waveform expressing a relationship between an in-mold pressure and an in-mold temperature and a specific volume of the molding resin; generating a designed state waveform including an isobaric phase and an isochoric phase following the isobaric phase while taking into consideration the simulated state waveform; obtaining an updated packing pressure profile for applying a molding pressure to at least a portion of the genuine domain while taking into consideration a difference between the simulated state waveform and the designed state waveform; and setting the molding machine while taking into consideration the updated packing pressure profile to perform an actual molding by applying an actual molding pressure to the at least a portion of the genuine domain to prepare the molding product.

In some embodiments of the present disclosure, a molding system comprising a molding machine, a mold disposed on the molding machine, and a computing apparatus connected to the molding machine, wherein the computing apparatus is programmed to perform operations including specifying a simulating domain corresponding to a genuine domain in the mold, wherein the genuine domain has a mold cavity to be filled with a molding resin from the molding machine to prepare a molding product; performing a virtual molding by using a setting packing pressure profile to generate a simulated state waveform expressing a relationship between an in-mold pressure and an in-mold temperature and a specific volume of the molding resin; generating a designed state waveform including an isobaric phase and an isochoric phase following the isobaric phase while taking into consideration the simulated state waveform; obtaining an updated packing pressure profile for applying a molding pressure to at least a portion of the genuine domain while taking into consideration a difference between the simulated state waveform and the designed state waveform; and setting the molding machine while taking into consideration the updated packing pressure profile to perform an actual molding by applying an actual molding pressure to the at least a portion of the genuine domain to prepare the molding product.

In some embodiments of the present disclosure, a non-transitory computer medium contains computer instructions stored therein for causing a computer processor to perform operations of specifying a simulating domain corresponding to a genuine domain in a mold disposed on the molding machine, wherein the genuine domain has a mold cavity to be filled with a molding resin from the molding machine to prepare a molding product; performing a virtual molding by using a setting packing pressure profile to generate a simulated state waveform expressing a relationship between an in-mold pressure and an in-mold temperature and a specific volume of the molding resin; generating a designed state waveform including an isobaric phase and an isochoric phase following the isobaric phase while taking into consideration the simulated state waveform; obtaining an updated packing pressure profile for applying a molding pressure to at least a portion of the genuine domain while taking into consideration a difference between the simulated state waveform and the designed state waveform; and setting the molding machine while taking into consideration the updated packing pressure profile to perform an actual molding by applying an actual molding pressure to the at least a portion of the genuine domain to prepare the molding product.

The conventional operation of the injection molding may use a constant packing pressure to apply a pressure to the sprue portion of the mold, and the constant packing pressure could be a random value assigned by an operator of the molding machine according to the operator's experience. However, setting the packing pressure of the injection molding requires a large number of trial molding operations and a long setting time actually performed on the injection molding machine because the setting work greatly depends on the know-how and experience of an operator of the injection molding machine, and various physical values affect one another as well.

In the present disclosure, the size (volume) and the shape of the molding product will be substantially the same as the design if the molding resin is molded by using a designed state waveform. In other words, the shrinkage problem of the molding product can be effectively solved, and the molding product can be manufactured precisely and accurately. The present disclosure generates a designed state waveform according to the properties of the molding resin, and implements the large number of trial molding operations by the molding simulation technique so as to obtain a packing pressure profile, which can generate a simulated state waveform substantially the same as the designed state waveform of the molding resin with the designed property (specific volume) in the mold. Subsequently, the molding machine is set while taking into consideration the packing pressure profile to apply an actual pressure to the at least a portion of the genuine domain so as to actually manufacture the molding product with the designed size (volume) and shape. In other words, the shrinkage problem of the molding product can be effectively solved, and the molding product can be manufactured precisely and accurately.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for operating a molding machine, comprising steps of:
    specifying a simulating domain corresponding to a genuine domain in a mold disposed on the molding machine, wherein the genuine domain has a mold cavity to be filled with a molding resin from the molding machine to prepare a molding product;
    performing a virtual molding by using a setting packing pressure profile to generate a simulated state waveform expressing a relationship between an in-mold pressure and an in-mold temperature of the molding resin;
    generating a designed state waveform including an isobaric phase and an isochoric phase following the isobaric phase, wherein the designed state waveform is generated using the simulated state waveform;
    obtaining an updated packing pressure profile for applying a molding pressure to at least a portion of the genuine domain, wherein the updated packing pressure profile is obtained using a difference between the simulated state waveform and the designed state waveform; and
    setting the molding machine to perform an actual molding by applying an actual molding pressure to the at least a portion of the genuine domain to prepare the molding product, wherein the molding condition is set using the updated packing pressure profile.

2. The method for operating a molding machine of claim 1, wherein the step of generating a designed state waveform comprises setting a specific volume of the isochoric phase using an ejection temperature of the molding resin at a normal pressure.

3. The method for operating a molding machine of claim 1, wherein the step of generating a designed state waveform comprises setting a high pressure using a specific volume of the isochoric phase.

4. The method for operating a molding machine of claim 3, wherein the step of generating a designed state waveform comprises setting a low pressure using the simulated state waveform substantially without a pressure drop.

5. The method for operating a molding machine of claim 4, wherein the step of generating a designed state waveform comprises setting a packing pressure of the isobaric phase between the high pressure and the low pressure.

6. The method for operating a molding machine of claim 1, wherein the step of generating a designed state waveform comprises checking if a transition temperature from the isobaric phase to the isochoric is higher than a gate-freezing temperature of the molding resin.

7. The method for operating a molding machine of claim 1, wherein the step of obtaining an updated packing pressure profile comprises comparing the simulated state waveform and the designed state waveform in terms of a variation of the in-mold pressure with respect to a molding time.

8. The method for operating a molding machine of claim 1, wherein the step of obtaining an updated packing pressure profile comprises comparing the simulated state waveform and the designed state waveform in terms of a variation of the in-mold pressure with respect to the in-mold temperature.

9. The method for operating a molding machine of claim 1, wherein the step of obtaining an updated packing pressure profile comprises comparing the simulated state waveform and the designed state waveform in terms of a variation of an in-mold volume with respect to a molding time.

10. The method for operating a molding machine of claim 1, further comprising a step of repeating the virtual molding using the updated packing pressure profile to generate an updated state waveform of the molding resin.

* * * * *